United States Patent
Wu et al.

(10) Patent No.: US 12,528,478 B2
(45) Date of Patent: Jan. 20, 2026

(54) FAULT DIAGNOSIS METHOD AND FAULT DIAGNOSIS DEVICE FOR VEHICLE SPEED MEASUREMENT DEVICE

(71) Applicant: Shenzhen Yinwang Intelligent Technologies Co., Ltd., Shenzhen (CN)

(72) Inventors: Zixian Wu, Shanghai (CN); Shuaifei Li, Shanghai (CN); Yongyou Zhou, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 204 days.

(21) Appl. No.: 18/186,390

(22) Filed: Mar. 20, 2023

(65) Prior Publication Data
US 2023/0227052 A1  Jul. 20, 2023

Related U.S. Application Data

(63) Continuation of application No. PCT/CN2020/116411, filed on Sep. 21, 2020.

(51) Int. Cl.
*B60W 50/02* (2012.01)
*B60W 40/105* (2012.01)

(52) U.S. Cl.
CPC ...... *B60W 50/0205* (2013.01); *B60W 40/105* (2013.01); *B60W 2554/20* (2020.02); *B60W 2554/80* (2020.02)

(58) Field of Classification Search
CPC .......... B60W 40/105; B60W 50/0205; B60W 2050/021; B60W 2050/0215; B60W 2554/20; B60W 2554/80
See application file for complete search history.

(56) References Cited

U.S. PATENT DOCUMENTS

| | | | |
|---|---|---|---|
| 5,524,078 A | 6/1996 | Kolb et al. | |
| 2017/0242121 A1* | 8/2017 | Tanaka | G01S 7/497 |
| 2020/0031352 A1* | 1/2020 | Takaki | B60W 60/0015 |
| 2020/0402249 A1* | 12/2020 | Kim | G01S 17/86 |
| 2021/0149051 A1* | 5/2021 | Ding | G01S 7/4808 |

FOREIGN PATENT DOCUMENTS

| | | |
|---|---|---|
| CN | 1776392 A | 5/2006 |
| CN | 103914889 A | 7/2014 |
| CN | 105818744 A | 8/2016 |

(Continued)

*Primary Examiner* — Peter D Nolan
*Assistant Examiner* — Ce Li Li
(74) *Attorney, Agent, or Firm* — Leydig, Voit & Mayer, Ltd.

(57) ABSTRACT

A fault diagnosis method and a fault diagnosis apparatus for a vehicle speed measurement apparatus. The method includes: obtaining a first vehicle speed measured by the speed measurement apparatus; obtaining reference information of a static reference object at N moments, where N is an integer greater than 1, and the reference information includes information about a location relationship of the static reference object relative to a vehicle in which the speed measurement apparatus is located at each of the N moments; calculating a second vehicle speed based on the reference information; and determining, based on the first vehicle speed and the second vehicle speed, whether the speed measurement apparatus is faulty.

15 Claims, 9 Drawing Sheets

(56) References Cited

FOREIGN PATENT DOCUMENTS

| | | |
|---|---|---|
| CN | 106803350 A | 6/2017 |
| CN | 107782917 A | 3/2018 |
| CN | 110231496 A | 9/2019 |
| CN | 110231497 A | 9/2019 |
| CN | 111089984 A | 5/2020 |
| WO | 2020180997 A1 | 9/2020 |

* cited by examiner

FAULT DIAGNOSIS METHOD AND FAULT DIAGNOSIS DEVICE FOR VEHICLE SPEED MEASUREMENT DEVICE

CROSS-REFERENCE TO RELATED APPLICATIONS

This application is a continuation of International Application No. PCT/CN2020/116411, filed on Sep. 21, 2020, the disclosure of which is hereby incorporated by reference in its entirety.

TECHNICAL FIELD

The embodiments relate to the field of vehicle technologies, a fault diagnosis method, and an apparatus for a vehicle speed measurement apparatus.

BACKGROUND

Vehicle speed information is important information for vehicle driving control. Various electronic control apparatuses of a vehicle, such as an electronic stability program (ESP), an anti-lock braking system (ABS), a traction control system (TCS), and vehicle navigation, all need to use the vehicle speed information to generate a control signal. If a speed measurement apparatus (such as a vehicle speed sensor) causes inaccurate vehicle speed measurement, the control signal is faulty, and a serious safety problem is also caused. Therefore, it is very important to determine whether the vehicle speed measurement apparatus is faulty.

A common diagnosis method for a speed measurement apparatus is to use self-vehicle power information (which may be understood as information related to vehicle motion, or may be understood as information that affects a vehicle speed) other than vehicle speed information as a basis for diagnosis, to determine whether a vehicle speed is accurate, and further determine whether the speed measurement apparatus works normally. For example, in an electrical fault diagnosis method, when an electrical fault is detected, it may be determined that an initial speed sensor cannot work normally. However, in this method, only a connection fault such as circuit break or short-circuit can be detected. For another example, a manner of performing diagnosis based on a rotational speed and a torque of an engine and a shift brake signal is equivalent to inferring a vehicle speed based on the information such as the rotational speed and the torque and the brake signal, to compare the vehicle speed with the vehicle speed measured by the speed measurement apparatus. If the two vehicle speeds are inconsistent, it is determined that the speed measurement apparatus is faulty. However, in this manner, diagnosis cannot be performed when a vehicle is climbing. For still another example, a manner of performing diagnosis based on a wheel speed of a wheel is equivalent to inferring a vehicle speed based on the wheel speed, to compare the vehicle speed with the vehicle speed measured by the speed measurement apparatus. If the two vehicle speeds are inconsistent, it is determined that the speed measurement apparatus is faulty. However, in this manner, diagnosis cannot be performed when the wheel is slippery or stuck.

In short, the foregoing diagnosis method in which diagnosis is performed based on other self-vehicle power information can be valid only in a case of the diagnosis method, and a diagnosis range is very limited. Once the diagnosis method exceeds the diagnosis range, the diagnosis method is invalid.

Therefore, how to more accurately diagnose a fault of the speed measurement apparatus is an urgent problem to be resolved.

SUMMARY

The embodiments may provide a fault diagnosis method and apparatus for a vehicle speed measurement apparatus, so that a diagnosis range is wider, and a fault of the speed measurement apparatus can be more accurately diagnosed.

According to a first aspect, a fault diagnosis method for a vehicle speed measurement apparatus is provided. The method includes: obtaining a first vehicle speed measured by the speed measurement apparatus; obtaining reference information of a static reference object at N moments, where N is an integer greater than 1, and the reference information includes information about a location relationship of the static reference object relative to a vehicle in which the speed measurement apparatus is located at each of the N moments; calculating a second vehicle speed based on the reference information; and determining, based on the first vehicle speed and the second vehicle speed, whether the speed measurement apparatus is faulty.

A vehicle speed may be estimated by using a reference object other than the vehicle and may be further compared with the vehicle speed measured by the speed measurement apparatus, so that whether the speed measurement apparatus is faulty can be determined. This solution does not need to rely on self-vehicle power information of the vehicle, and therefore is not limited by coverage of each type of self-vehicle power information. Therefore, this solution has a wider diagnosis range, so that a fault of the speed measurement apparatus can be more accurately diagnosed.

It should be noted that, in this embodiment, the second vehicle speed may be used to indicate an estimated vehicle speed or may be understood as an inferred vehicle speed or a vehicle speed obtained through measurement by an apparatus that is not a speed measurement apparatus.

Optionally, the N moments may be consecutive moments, or may be inconsecutive moments, provided that the N moments are close to a moment corresponding to the first vehicle speed.

Optionally, N moments in a time length threshold range may be selected based on the moment corresponding to the first vehicle speed. Assuming that the first vehicle speed is measured at a moment T1 and the time length threshold range is $\Delta t$, N moments in a range of $[T1-\Delta t, T1+\Delta t]$ may be selected. It should be understood that the N moments do not necessarily include T1. For example, N moments from T1+1 to T1+N may be selected. It should be further understood that the N moments may be consecutive, or may be inconsecutive. This is not limited.

Optionally, the static reference object may be directly set as a road sign, a transportation facility, or the like, so that each step for fault diagnosis is started once the road sign or the transportation facility is recognized.

Optionally, objects around the vehicle may be obtained, static objects are selected from the recognized objects, and the static reference object is selected from the static objects.

With reference to the first aspect, before the obtaining reference information, the fault diagnosis method further includes: recognizing objects around the vehicle by using a sensing device of the vehicle; and selecting the static reference object from the recognized objects.

Optionally, the sensing device may include a camera or a radar.

Regardless of whether a road is flat or sloped, or regardless of whether the vehicle travels straight or turns, the second vehicle speed may be estimated based on a relative relationship between the static reference object and the vehicle and a time interval for obtaining the static reference object. The following separately describes different road conditions and different vehicle traveling conditions.

With reference to the first aspect, the second vehicle speed may be further calculated by using the following method: obtaining at least one estimated vehicle speed through calculation by using the reference information at the N moments, that is, the location relationship of the static reference object relative to the vehicle at the N moments, where the estimated vehicle speed is an average vehicle speed between any two moments in the N moments; and processing the at least one estimated vehicle speed to obtain the second vehicle speed.

With reference to the first aspect, when the vehicle and the static reference object are on a same road plane and the vehicle travels straight, the following operations may be performed:

obtaining a displacement of the vehicle relative to the static reference object between the two moments through calculation by using a distance of the static reference object relative to the vehicle and an included angle between the static reference object and a traveling direction of the vehicle; and obtaining the average speed between the two moments through calculation by using the displacement and a time length between the two moments.

With reference to the first aspect, when the vehicle and the static reference object are on a same road plane and the vehicle turns, the following operations may be performed:

obtaining a steering angle of the vehicle between the two moments and a steering radius of the vehicle through calculation by using a distance between the static reference object and the vehicle, a wheel steering angle of the vehicle, and a length of the vehicle; and obtaining the average speed between the two moments through calculation by using the steering angle, the steering radius, and a time length between the two moments.

With reference to the first aspect, when the vehicle and the static reference object are not on a same road plane and the vehicle travels straight, the following operations may be performed:

establishing any three-dimensional coordinate system, and indicating coordinates of the static reference object and coordinates of locations of the vehicle at the two moments;

obtaining a displacement of the vehicle relative to the static reference object between the two moments through calculation based on the coordinates of the static reference object and the coordinates of the locations of the vehicle at the two moments; and obtaining the average speed between the two moments through calculation by using the displacement and a time length between the two moments.

With reference to the first aspect, when the vehicle and the static reference object are not on a same road plane and the vehicle turns, the following operations may be performed:

establishing any three-dimensional coordinate system, and indicating coordinates of the static reference object and coordinates of locations of the vehicle at the two moments;

obtaining a steering angle of the vehicle between the two moments and a steering radius of the vehicle through calculation by using a distance between the static reference object and the vehicle, a wheel steering angle of the vehicle, and a length of the vehicle; and obtaining the average speed between the two moments through calculation by using the steering angle, the steering radius, and a time length between the two moments.

Optionally, the second vehicle speed may be obtained in a manner such as taking an average, a maximum value, or a minimum value. The following separately provides descriptions by using examples. It should be understood that, when there is only one estimated vehicle speed, a calculation result is equal to the estimated vehicle speed in any one of the foregoing manners of taking an average, a maximum value, and a minimum value. In this case, the estimated vehicle speed is the second vehicle speed. The following may describe a processing manner used when there may be a plurality of estimated vehicle speeds. However, it should be understood that only one estimated vehicle speed may be considered as a special case of the plurality of estimated vehicle speeds.

For example, the plurality of estimated vehicle speeds may be averaged to obtain an average estimated vehicle speed and the average estimated vehicle speed may be used as the second vehicle speed.

For another example, a maximum value may be selected from the plurality of estimated vehicle speeds as the second vehicle speed.

For another example, a minimum value may be selected from the plurality of estimated vehicle speeds as the second vehicle speed.

For another example, a maximum value and/or a minimum value may be removed, and then an average of remaining estimated vehicle speeds is used as the second vehicle speed.

With reference to the first aspect, when the at least one estimated vehicle speed is processed to obtain the second vehicle speed, mean filtering or median filtering may be performed on the at least one estimated vehicle speed, and a vehicle speed obtained through the filtering is used as the second vehicle speed.

Optionally, whether the speed measurement apparatus is faulty may be determined based on a difference between the first vehicle speed and the second vehicle speed. When the difference falls within a threshold range, it is determined that the first vehicle speed is correct and the speed measurement apparatus is not faulty. When the difference does not fall within the threshold range, it is determined that the first vehicle speed is incorrect and the speed measurement apparatus is faulty.

With reference to the first aspect, whether the speed measurement apparatus is faulty may be determined based on the first vehicle speed and the second vehicle speed by using the following method.

When the difference between the first vehicle speed and the second vehicle speed is greater than a first preset threshold, it is determined that the speed measurement apparatus is faulty.

When the difference between the first vehicle speed and the second vehicle speed is less than or equal to the first preset threshold, it is determined that the speed measurement apparatus is not faulty.

Optionally, a plurality of second vehicle speeds may be calculated, to prevent an error from occurring in fault diagnosis because the second vehicle speed is estimated incorrectly or with a relatively large error. Then, when an error between the plurality of second vehicle speeds is relatively large, fault diagnosis is not performed. In other words, an inaccurate estimated second vehicle speed is not used as a basis for diagnosis.

Optionally, the plurality of second vehicle speeds may be obtained based on a same static reference object by using the foregoing method; or a plurality of static reference objects may be set, and second vehicle speeds of the plurality of reference objects are obtained by using the foregoing method.

Two second vehicle speeds are used as an example. A difference between each of the two second vehicle speeds and the first vehicle speed may be compared. Only when both differences are less than or equal to a specified threshold, it is determined that a vehicle speed sensor is faulty; otherwise, the second vehicle speed is re-obtained.

For another example, the following may be set: The second vehicle speed may be re-obtained when a difference between any one of the two second vehicle speeds and the first vehicle speed is greater than a threshold.

A case for three or more second vehicle speeds is similar, and is not described herein.

With reference to the first aspect, there may be a plurality of static reference objects. In this case, reference information of the plurality of static reference objects may be obtained; a plurality of second vehicle speeds are calculated based on the reference information; and whether the speed measurement apparatus is faulty is determined based on the first vehicle speed and the plurality of second vehicle speeds.

It should be noted that obtaining the reference information of the plurality of static reference objects may be understood as obtaining reference information of a plurality of moments of each of the plurality of static reference objects.

With reference to the first aspect, during determining of whether the speed measurement apparatus is faulty based on the first vehicle speed and the plurality of second vehicle speeds, when a difference between the plurality of second vehicle speeds is greater than a second preset threshold, the second vehicle speed may be re-obtained; or when the difference between the plurality of second vehicle speeds is less than or equal to the second preset threshold, whether the speed measurement apparatus is faulty may be determined.

According to a second aspect, a fault diagnosis apparatus for a vehicle speed measurement apparatus is provided. The apparatus includes units configured to perform the method of the first aspect.

According to a third aspect, a chip is provided. The chip includes a processor and a data interface. The processor reads, through the data interface, instructions stored in a memory, to perform the method of the first aspect.

Optionally, the chip may further include the memory. The memory stores the instructions. The processor is configured to execute the instructions stored in the memory. When the instructions are executed, the processor is configured to perform the method of the first aspect.

According to a fourth aspect, a vehicle is provided. The vehicle includes the fault diagnosis apparatus and the speed measurement apparatus of the second aspect, and the fault diagnosis apparatus is configured to perform fault diagnosis on the speed measurement apparatus.

According to a fifth aspect, a non-transitory computer-readable medium is provided. The non-transitory computer-readable medium stores program code to be executed by a device. The program code includes instructions used to perform the method of the first aspect.

According to a sixth aspect, a computer program product including instructions is provided. When the computer program product runs on a computer, the computer is enabled to perform the method of the first aspect.

DETAILED DESCRIPTION OF THE EMBODIMENTS

A fault diagnosis method and/or apparatus for a vehicle speed measurement apparatus provided in the embodiments may be applied to various vehicles. The method and/or apparatus may be applied to manual driving, assisted driving, and autonomous driving. The following describes the embodiments with reference to the accompanying drawings.

Figure 1:
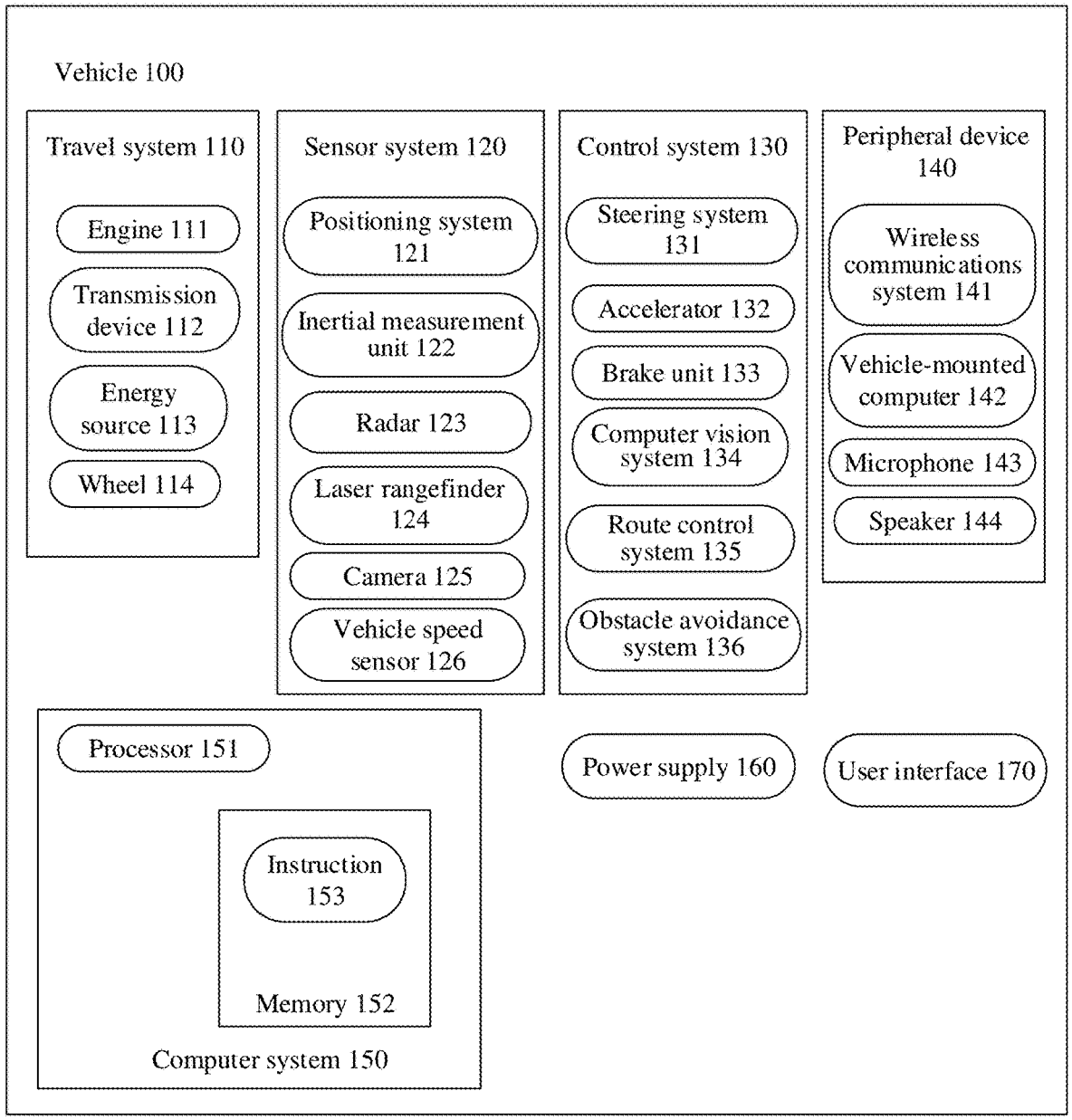
FIG. 1 is a functional block diagram of a vehicle to which an embodiment is applicable.

FIG. 1 is a functional block diagram of a vehicle to which an embodiment is applicable. The vehicle 100 may be a manual vehicle, or the vehicle 100 may be configured to be in fully or partially autonomous driving mode.

For example, the vehicle 100 may control the vehicle 100 when the vehicle 100 is in autonomous driving mode. The vehicle 100 may determine current statuses of the vehicle and an ambient environment of the vehicle through a manual operation, determine a possible behavior of at least one another vehicle in the ambient environment, determine a confidence level corresponding to a possibility that the another vehicle performs the possible behavior, and control the vehicle 100 based on determined information. When the vehicle 100 is in the autonomous driving mode, the vehicle 100 may be set to operating without interaction with a person.

The vehicle 100 may include various subsystems, such as a travel system 110, a sensor system 120, and a control system 130, one or more peripheral devices 140, a power supply 160, a computer system 150, and a user interface 170.

Optionally, the vehicle 100 may include more or fewer subsystems, and each subsystem may include a plurality of elements. In addition, all the subsystems and elements of the vehicle 100 may be interconnected in a wired or wireless manner.

For example, the travel system 110 may include a component that provides power for the vehicle 100 to move. In an embodiment, the travel system 110 may include an engine 111, a transmission device 112, an energy source 113, and a wheel/tire 114. The engine 111 may be an internal combustion engine, a motor, an air compression engine, or a combination of other types of engines, for example, a hybrid engine including a gasoline engine and an electronic motor, or a hybrid engine including an internal combustion engine and an air compression engine. The engine 111 may convert the energy source 113 into mechanical energy.

For example, the energy source 113 includes gasoline, diesel, another petroleum-based fuel, propane, another compressed gas-based fuel, ethanol, a solar panel, a battery, and another power source. The energy source 113 may also provide energy to another system of the vehicle 100.

For example, the transmission device 112 may include a gearbox, a differential, and a drive shaft. The transmission device 112 may transmit mechanical power from the engine 111 to the wheel 114.

In an embodiment, the transmission device 112 may further include another device, for example, a clutch. The drive shaft may include one or more shafts that may be coupled to one or more wheels 114.

For example, the sensor system 120 may include several sensors that sense information about an ambient environment of the vehicle 100.

For example, the sensor system 120 may include a positioning system 121 (such as a global positioning system (GPS), a BeiDou Navigation Satellite System, or another positioning system), an inertial measurement unit (IMU) 122, a radar 123, a laser rangefinder 124, a camera 125, and a vehicle speed sensor 126. The sensor system 120 may further include sensors (for example, an in-vehicle air quality monitor, a fuel gauge, and an oil temperature gauge) in an internal system of the monitored vehicle 100. Sensor data from one or more of these sensors may be used to detect an object and corresponding features (a position, a shape, a direction, a speed, and the like) of the object. Such detection and recognition are key functions for ensuring a safety operation of the automated vehicle 100.

The positioning system 121 may be configured to estimate a geographical position of the vehicle 100. The IMU 122 may be configured to sense changes of a position and an orientation of the vehicle 100 based on inertial acceleration. In an embodiment, the IMU 122 may be a combination of an accelerometer and a gyroscope.

For example, the radar 123 may sense an object in the ambient environment of the vehicle 100 by using a radio signal. In some embodiments, in addition to sensing the object, the radar 123 may be further configured to sense a speed and/or a moving direction of the object.

For example, the laser rangefinder 124 may sense, by using a laser, an object in an environment in which the vehicle 100 is located. In some embodiments, the laser rangefinder 124 may include one or more laser sources, a laser scanner, one or more detectors, and another system component.

For example, the camera 125 may be configured to capture a plurality of images of the ambient environment of the vehicle 100. For example, the camera 125 may be a static camera or a video camera.

For example, the vehicle speed sensor 126 may be configured to measure a speed of the vehicle 100. For example, the vehicle speed sensor 126 may measure the speed of the vehicle in real time. The measured vehicle speed may be transferred to the control system 130 to control the vehicle.

As shown in FIG. 1, the control system 130 controls operations of the vehicle 100 and components of the vehicle. The control system 130 may include various elements, such as a steering system 131, an accelerator 132, a brake unit 133, a computer vision system 134, a route control system 135, and an obstacle avoidance system 136.

For example, the steering system 131 may be operated to adjust a moving direction of the vehicle 100. For example, in an embodiment, the steering system may be a steering wheel system. The accelerator 132 may be configured to control an operating speed of the engine 111 and further control the speed of the vehicle 100.

For example, the brake unit 133 may be configured to control the vehicle 100 to decelerate. The brake unit 133 may slow down the wheel 114 by using friction. In another embodiment, the brake unit 133 may convert kinetic energy of the wheel 114 into a current. The brake unit 133 may alternatively slow down a rotation speed of the wheel 114 in another manner, to control the speed of the vehicle 100.

As shown in FIG. 1, the computer vision system 134 may be operated to process and analyze images captured by the camera 125, to recognize objects and/or features in the ambient environment of the vehicle 100. The objects and/or features may include a traffic signal, a road boundary, and an obstacle. The computer vision system 134 may use an object recognition algorithm, a structure from motion (SFM) algorithm, video tracking, and another computer vision technology. In some embodiments, the computer vision system 134 may be configured to: draw a map for the environment, track an object, estimate a speed of the object, and the like.

For example, the route control system 135 may be configured to determine a driving route of the vehicle 100. In some embodiments, the route control system 135 may determine the driving route for the vehicle 100 with reference to data from a sensor, the GPS, and one or more predetermined maps.

As shown in FIG. 1, the obstacle avoidance system 136 may be configured to recognize, evaluate, and avoid or bypass, in another manner, a potential obstacle in the environment of the vehicle 100.

In an instance, the control system 130 may add or alternatively include components other than those shown and described. Alternatively, the control system 130 may not include some of the components shown above.

As shown in FIG. 1, the vehicle 100 may interact with an external sensor, another vehicle, another computer system, or a user via the peripheral device 140. The peripheral device 140 may include a wireless communications system 141, a vehicle-mounted computer 142, a microphone 143, and/or a speaker 144.

In some embodiments, the peripheral device 140 may provide a way for the vehicle 100 to interact with the user interface 170. For example, the vehicle-mounted computer 142 may provide information for the user of the vehicle 100. The user interface 116 may be further used to operate the vehicle-mounted computer 142 to receive a user input. The vehicle-mounted computer 142 may be operated through a touchscreen. In another case, the peripheral device 140 may provide a way for the vehicle 100 to communicate with another device in the vehicle. For example, the microphone 143 may receive audio (for example, a voice command or another audio input) from the user of the vehicle 100. Likewise, the speaker 144 may output audio to the user of the vehicle 100.

As shown in FIG. 1, the wireless communications system 141 may communicate with one or more devices directly or through a communications network in a wireless manner. For example, the wireless communications system 141 may use 3G cellular communication such as code division multiple access (CDMA), EVDO, a global system for mobile communications (or GSM)/a general packet radio service (GPRS), 4G cellular communication such as long term evolution (LTE), or 5G cellular communication. The wireless communications system 141 may communicate with a wireless local area network (WLAN) through Wi-Fi.

In some embodiments, the wireless communications system 141 may communicate with a device through an infrared link, Bluetooth, or ZigBee directly or by using other wireless protocols such as various vehicle communications systems. For example, the wireless communications system 141 may include one or more dedicated short-range communications (DSRC) devices, and these devices may include public and/or private data communication between vehicles and/or roadside stations.

As shown in FIG. 1, the power supply 160 may supply power to various components of the vehicle 100. In an embodiment, the power supply 160 may be a rechargeable lithium-ion or lead-acid battery. One or more battery packs of such batteries may be configured as the power supply to supply power to the components of the vehicle 100. In some embodiments, the power supply 160 and the energy source 113 may be implemented together, as in some pure electric vehicles.

For example, some or all of functions of the vehicle 100 may be controlled by the computer system 150. The computer system 150 may include at least one processor 151. The processor 151 executes instructions 153 stored in, for example, a non-transient computer-readable medium in a memory 152. The computer system 150 may further control a plurality of computing devices in an individual component or a subsystem of the vehicle 100 in a distributed manner.

For example, the processor 151 may be any conventional processor such as a commercially available central processing unit (CPU).

Optionally, the processor may be a dedicated device such as an application-specific integrated circuit (ASIC) or another hardware-based processor. Although FIG. 1 functionally illustrates the processor, the memory, and other elements of a computer in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Therefore, a reference to the processor or the computer is understood as including a reference to a set of processors, computers, or memories that may or may not be operated in parallel. Unlike using a single processor to perform the steps described herein, some components such as a steering component and a deceleration component may include respective processors. The processors each perform only calculation related to a component-specific function.

In various aspects described herein, the processor may be located far away from the vehicle and communicate with the vehicle in a wireless manner. In other aspects, some of the processes described herein are performed by the processor disposed inside the vehicle, and other processes are performed by a remote processor. The processes include necessary steps for performing a single operation.

In some embodiments, the memory 152 may include the instructions 153 (for example, program logic). The instructions 153 may be executed by the processor 151 to perform various functions of the vehicle 100, including those functions described above. The memory 152 may also include additional instructions, including instructions to send data to, receive data from, interact with, and/or control one or more of the travel system 110, the sensor system 120, the control system 130, and the peripheral device 140.

For example, in addition to the instructions 153, the memory 152 may store data such as road maps, route information, a location, direction, and speed of the vehicle, other such vehicle data, and other information. Such information may be used by the vehicle 100 and the computer system 150 during operation of the vehicle 100 in autonomous, semi-autonomous, and/or manual modes.

As shown in FIG. 1, the user interface 170 may be configured to provide information to or receive information from the user of the vehicle 100. Optionally, the user interface 170 may be included in one or more input/output devices in a set of the peripheral devices 140, for example, the wireless communications system 141, the vehicle-mounted computer 142, the microphone 143, and the speaker 144.

In this embodiment, the computer system 150 may control functions of the vehicle 100 based on inputs received from various subsystems (for example, the travel system 110, the sensor system 120, and the control system 130) and the user interface 170. For example, the computer system 150 may use an input from the control system 130 to control the brake unit 133, to avoid an obstacle that is detected by the sensor system 120 and the obstacle avoidance system 136. In some embodiments, the computer system 150 may be operated to provide control over many aspects of the vehicle 100 and the subsystems of the vehicle 100.

Optionally, one or more of the foregoing components may be mounted separately from or associated with the vehicle 100. For example, the memory 152 may exist partially or completely separate from the vehicle 100. The foregoing components may be communicatively coupled together in a wired and/or wireless manner.

Optionally, the foregoing components are merely an example. During actual application, components in the foregoing modules may be added or removed based on an actual requirement. FIG. 1 should not be construed as a limitation on this embodiment.

Optionally, the vehicle 100 may be an autonomous driving vehicle traveling on a road and may recognize an object in the ambient environment of the vehicle, to determine to adjust a current speed. The object may be another vehicle, a traffic control device, or another type of object. In some examples, each recognized object may be considered independently and may be used to determine a to-be-adjusted speed of the autonomous driving vehicle based on features of each object, such as a current speed of the object, acceleration of the object, or spacing between the object and the vehicle.

Optionally, the vehicle 100 or a computing device (for example, the computer system 150, the computer vision system 134, or the memory 152 shown in FIG. 1) associated with the vehicle 100 may predict behavior of the recognized object based on the features of the recognized object and a condition (for example, traffic, rain, or ice on a road) of the ambient environment.

Optionally, the recognized objects depend on behavior of each other. Therefore, all the recognized objects may be considered together to predict behavior of a single recognized object. The vehicle 100 can adjust the speed of the vehicle 100 based on the predicted behavior of the recognized object. In other words, the autonomous driving vehicle can determine, based on the predicted behavior of the object, that the vehicle needs to be adjusted to a stable state (for example, acceleration, deceleration, or stop). In this process, another factor may also be considered to determine the speed of the vehicle 100, for example, a horizontal location of the vehicle 100 on a road on which the vehicle travels, a curvature of the road, and proximity between a static object and a dynamic object.

In addition to providing an instruction for adjusting the speed of the autonomous driving vehicle, the computing device may further provide an instruction for modifying a steering angle of the vehicle 100, so that the autonomous driving vehicle follows a given trajectory and/or maintains safe lateral and longitudinal distances between the autonomous driving vehicle and an object near the autonomous driving vehicle (for example, a car in an adjacent lane on the road).

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not limited.

In a possible implementation, the vehicle 100 shown in FIG. 1 may be an autonomous driving vehicle. The following describes an autonomous driving system in detail.

Figure 2:
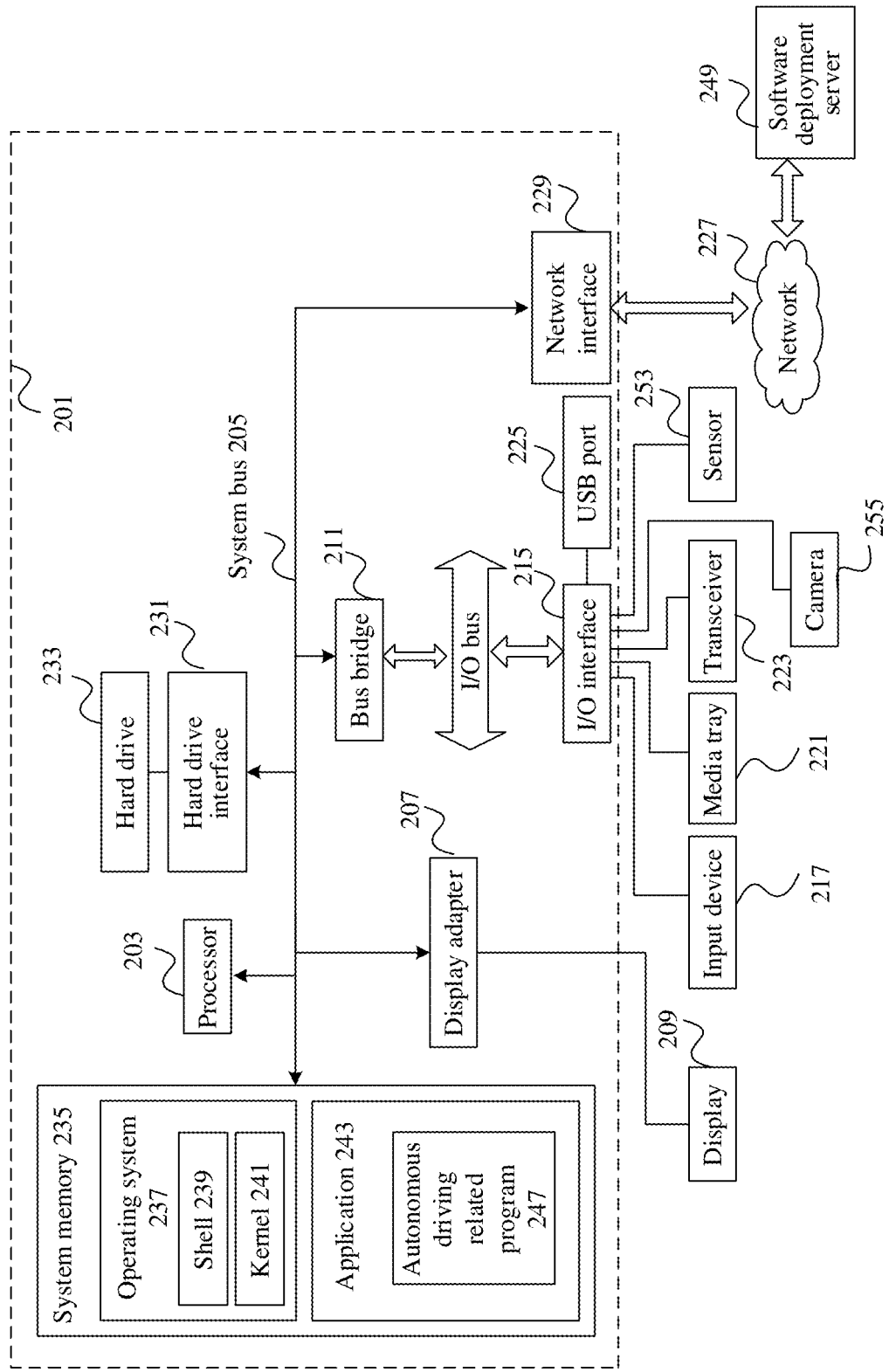
FIG. 2 is a schematic diagram of an autonomous driving system to which an embodiment is applicable.

FIG. 2 is a schematic diagram of an autonomous driving system to which an embodiment is applicable.

The autonomous driving system shown in FIG. 2 includes a computer system 201. The computer system 201 includes a processor 203, and the processor 203 is coupled to a system bus 205. The processor 203 may be one or more processors, and each processor may include one or more processor cores. A display adapter (video adapter) 207 may drive a display 209, and the display 209 is coupled to the system bus 205. The system bus 205 may be coupled to an input/output (I/O) bus 213 via a bus bridge 211. An I/O interface 215 is coupled to the I/O bus. The I/O interface 215 communicates with a plurality of I/O devices, such as an input device 217 (for example, a keyboard, a mouse, or a touchscreen) and a media tray 221 (for example, a CD-ROM or a multimedia interface). A transceiver 223 may transmit and/or receive a radio communication signal. A camera 255 may capture static and dynamic digital video images. An interface connected to the I/O interface 215 may be a USB port 225.

The processor 203 may be any conventional processor, for example, a reduced instruction set computing (RISC) processor, a complex instruction set computing (CISC) processor, or a combination thereof.

Optionally, the processor 203 may be a dedicated apparatus, for example, an application-specific integrated circuit (ASIC). The processor 203 may be a neural network processor or a combination of the neural network processor and the foregoing conventional processor.

Optionally, in some embodiments, the computer system 201 may be located at a position away from an autonomous driving vehicle and communicate with the autonomous driving vehicle in a wireless manner. In other aspects, some of processes may be performed by a processor disposed inside the autonomous driving vehicle, and other processes are performed by a remote processor. The processes include necessary steps for performing a single operation.

The computer system 201 may communicate with a software deployment server 249 through a network interface 229. The network interface 229 is a hardware network interface, for example, a network interface card. A network 227 may be an external network, for example, the Internet, or may be an internal network, for example, the Ethernet or a virtual private network (VPN). Optionally, the network 227 may alternatively be a wireless network, for example, a Wi-Fi network or a cellular network.

As shown in FIG. 2, a hard disk drive interface is coupled to the system bus 205. A hardware driver interface 231 may be connected to a hard disk drive 233. A system memory 235 is coupled to the system bus 205. Data running in the system memory 235 may include an operating system 237 and an application 243. The operating system 237 may include a shell 239 and a kernel 241. The shell 239 is an interface between a user and the kernel of the operating system. The shell may be the outermost layer of the operating system. The shell may manage interaction between the user and the operating system, for example, wait for a user input, interpret the user input for the operating system, and process a variety of output results of the operating system. The kernel 241 may include parts in the operating system that are configured to manage a memory, a file, a peripheral device, and a system resource. The kernel directly interacts with hardware. The kernel of the operating system may run processes, provides communication between the processes, and provides CPU time slice management, interruption, memory management, I/O management, and the like. The application 243 includes programs related to control of autonomous driving of the vehicle, for example, a program that manages interaction between the autonomous driving vehicle and an obstacle on a road, a program that controls a route or a speed of the autonomous driving vehicle, a program that controls interaction between the autonomous driving vehicle and another autonomous driving vehicle on a road. The application 243 also exists on a system of the software deployment server 249. In an embodiment, the computer system 201 may download an application from the software deployment server 249 when an autonomous driving related program 247 needs to be executed.

For example, the application 243 may alternatively be a program for interaction between the autonomous driving vehicle and a lane line on a road. In other words, the application 243 is a program that can track the lane line in real time.

For example, the application 243 may alternatively be a program that controls the autonomous driving vehicle to perform automatic parking.

For example, a sensor 253 may be associated with the computer system 201, and the sensor 253 may be configured to detect an ambient environment of the computer 201.

For example, the sensor 253 may detect a lane on a road, for example, may detect a lane line, and can track, in real time, a lane line change in a range in front of the vehicle in a moving (for example, running) process of the vehicle. For another example, the sensor 253 may detect an animal, an automobile, an obstacle, and a pedestrian crosswalk. Further, the sensor may detect ambient environments of the foregoing objects such as the animal, the automobile, the obstacle, and the pedestrian crosswalk. For example, the sensor may detect the ambient environment of the animal such as another animal that appears around the animal, a weather condition, and brightness of the ambient environment.

Optionally, if the computer 201 is located on the autonomous driving vehicle, the sensor may be a camera, an infrared sensor, a chemical detector, a microphone, or the like.

For example, in a lane line tracking scenario, the sensor 253 may be configured to detect a lane line in front of the vehicle, so that the vehicle can sense a lane change in a moving process, and real-time planning and adjustment on driving of the vehicle can be performed based on the lane change.

For example, in an automatic parking scenario, the sensor 253 may be configured to detect sizes or locations of a packing place and an obstacle around the vehicle, so that the vehicle can sense a distance between the packing place and the obstacle, and perform collision detection during parking, to prevent the vehicle from colliding with the obstacle.

In an example, the computer system 150 shown in FIG. 1 may also receive information from another computer system or transfer information to another computer system. Alternatively, sensor data collected by the sensor system 120 of the vehicle 100 may be transferred to another computer for processing of the data. The following uses FIG. 3 as an example for description.

Figure 3:
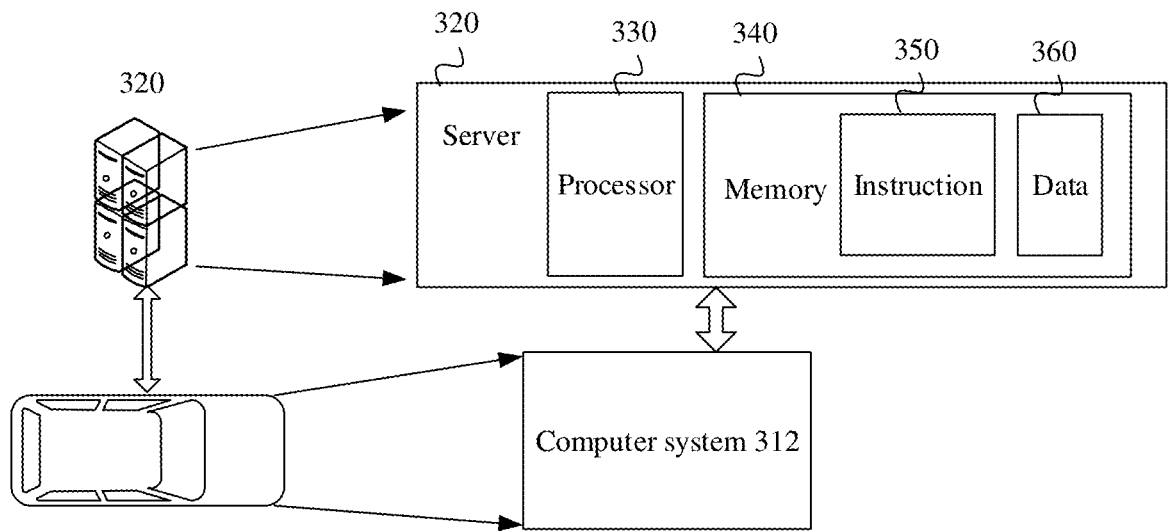
FIG. 3 is a schematic diagram of application of instructing an autonomous driving vehicle by a cloud side according to an embodiment.

FIG. 3 is a schematic diagram of instructing an autonomous driving vehicle by a cloud side according to an embodiment. As shown in FIG. 3, data from a computer system 312 may be transferred through a network to a cloud-side server 320 for further processing. The network and an intermediate node may include various configurations and protocols, including the internet, the world wide web, an intranet, a virtual private network, a wide area network, a local area network, a private network that uses proprietary communication protocols of one or more companies, the Ethernet, Wi-Fi, HTTP, and various combinations thereof. Such communication may be performed by any device capable of transferring data to another computer or receiving data from another computer, such as a modem and a wireless interface.

In an example, the server 320 may include a server having a plurality of computers, for example, a load balancing server cluster. The server exchanges information with different nodes on the network for purposes of receiving data from the computer system 312 and processing and transferring the data. The server may be configured similar to the computer system 312, and has a processor 330, a memory 340, instructions 350, and data 360.

For example, the data 360 of the server 320 may include information related to the road conditions around the vehicle. For example, the server 320 may receive, detect, store, update, and transfer the information related to the road conditions around the vehicle.

For example, the information related to the road conditions around the vehicle includes information about other vehicles and information about obstacles around the vehicle.

Currently, a speed measurement apparatus of a vehicle may be a vehicle speed sensor. However, in an actual use process, the vehicle speed sensor may be faulty, short-circuited, or the like. Consequently, a speed cannot be measured or a measured vehicle speed is inaccurate. To ensure vehicle safety, the fault of the vehicle speed sensor needs to be discovered in time. In the solutions in the conventional technology, a vehicle speed may be calculated by using other self-vehicle power information. The vehicle speed is compared with the measured vehicle speed, to determine whether the measured vehicle speed is normal, and further determine whether the speed measurement apparatus is normal. However, each solution of the existing solutions may not cover all working conditions. As mentioned above, the solution may be valid only in some cases and consequently a diagnosis range is limited.

For the foregoing problem, the embodiments may provide a new fault diagnosis method and apparatus for a vehicle speed measurement apparatus, so that a diagnosis range is wider, and a fault of the speed measurement apparatus can be more accurately diagnosed. A vehicle speed of the vehicle may be estimated by using a static reference object outside the vehicle, and then whether the vehicle speed measured by the speed measurement apparatus is normal may be determined based on the estimated vehicle speed, to determine whether the speed measurement apparatus is faulty. This solution does not need to rely on self-vehicle power information of the vehicle, and therefore is not limited by coverage of each type of self-vehicle power information. Therefore, this solution has a wider diagnosis range, so that a fault of the speed measurement apparatus can be more accurately diagnosed.

It should be noted that the self-vehicle power information may be understood as vehicle motion—related information, or may be understood as information that affects a vehicle speed. Because the self-vehicle power information (for example, a torque or a wheel speed) is directly related to the vehicle speed, that is, the self-vehicle power information directly affects the vehicle speed. However, the self-vehicle power information changes. In some scenarios, when a known correlation relationship is not met, a vehicle speed cannot be inferred correctly. For example, when the vehicle is climbing, a correlation relationship between a torque and a vehicle speed is broken, and consequently the vehicle speed cannot be inferred by using the torque. For another example, when a wheel is slippery, the vehicle is still moving (the vehicle speed is not 0), but a vehicle speed inferred based on a wheel speed is 0. Many other examples are not listed one by one. In short, the vehicle speed may be inferred by using the self-vehicle power information, to determine whether the speed measurement apparatus works normally. However, there is a great limitation. However, in the embodiments, the vehicle speed is estimated based on movement of the vehicle relative to an external reference object. Therefore, as long as the vehicle is moving, the vehicle can be detected, and a wider diagnosis range can be covered.

Figure 4:
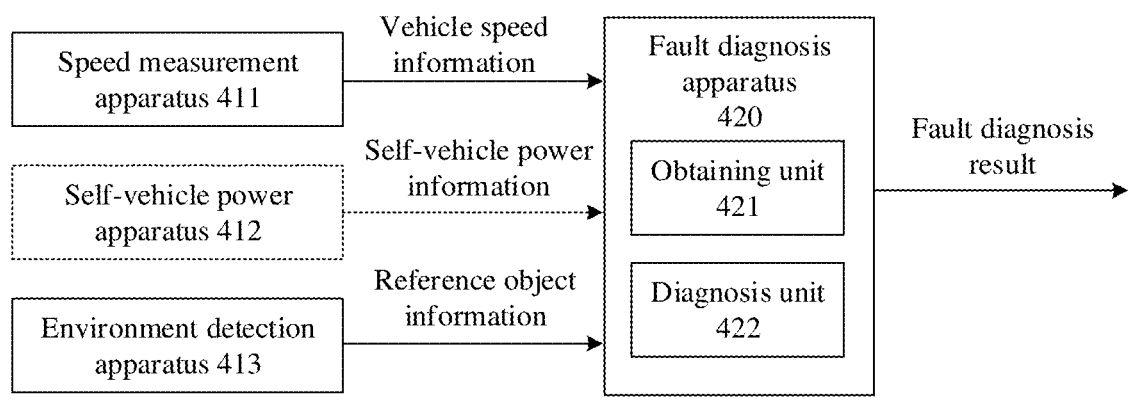
FIG. 4 is a schematic diagram of a fault diagnosis apparatus and application of the fault diagnosis apparatus according to an embodiment.

FIG. 4 is a schematic diagram of a fault diagnosis apparatus and application of the fault diagnosis apparatus according to an embodiment. As shown in FIG. 4, the fault diagnosis apparatus 420 may obtain some information from another apparatus and may obtain a fault diagnosis result after processing.

Optionally, the fault diagnosis apparatus 420 may include an obtaining unit 421 and a diagnosis unit 422.

The obtaining unit 421 may be configured to obtain some information (information in this embodiment may be understood as data), for example, may obtain vehicle speed information from a speed measurement apparatus 411. The vehicle speed information includes a vehicle speed measured by the speed measurement apparatus. For another example, the obtaining unit 421 may alternatively obtain information about a reference object from an environment detection apparatus 413. The reference object includes information about at least one static reference object.

Optionally, the environment detection apparatus 413 may be a radar detection apparatus, a camera, or the like, for example, may be a radar 123, a laser rangefinder 124, a camera 125, or a camera 255 shown in FIG. 1 or FIG. 2.

The diagnosis unit 422 may be configured to process the information obtained by the obtaining unit 421, to obtain a fault diagnosis result.

Optionally, the diagnosis unit 422 may infer an estimated vehicle speed based on the information about the reference object, and then determine, based on the estimated vehicle speed, whether the vehicle speed measured by the speed measurement apparatus is correct. When it is determined that the vehicle speed is correct, the fault diagnosis result is "normal" or "normal operation." When it is determined that the vehicle speed is incorrect (that no vehicle speed is measured is an example of an incorrect vehicle speed), the fault diagnosis result is "abnormal" or "abnormal operation." It should be noted that a diagnosis process of the diagnosis unit 422 is described with reference to each accompanying drawing in the following, and is not described herein.

In this solution, a vehicle speed is estimated by using a reference object other than a vehicle, and is further compared with the vehicle speed measured by the speed measurement apparatus, so that whether the speed measurement apparatus is faulty can be determined. This solution does not need to rely on a self-vehicle apparatus of the vehicle.

It should be noted that, in this embodiment, whether the speed measurement apparatus is normal may be determined without relying on the self-vehicle power apparatus of the vehicle. However, self-vehicle power information may be added for diagnosis, that is, the self-vehicle power information may be added as an extension of a diagnosis basis based on the foregoing solution. An implementation effect of the foregoing solution is not affected.

Optionally, the fault diagnosis apparatus 420 may further include a sending unit, configured to send the fault diagnosis result to another module or apparatus, for example, to a control system, to generate a control signal and control the vehicle.

Figure 5:
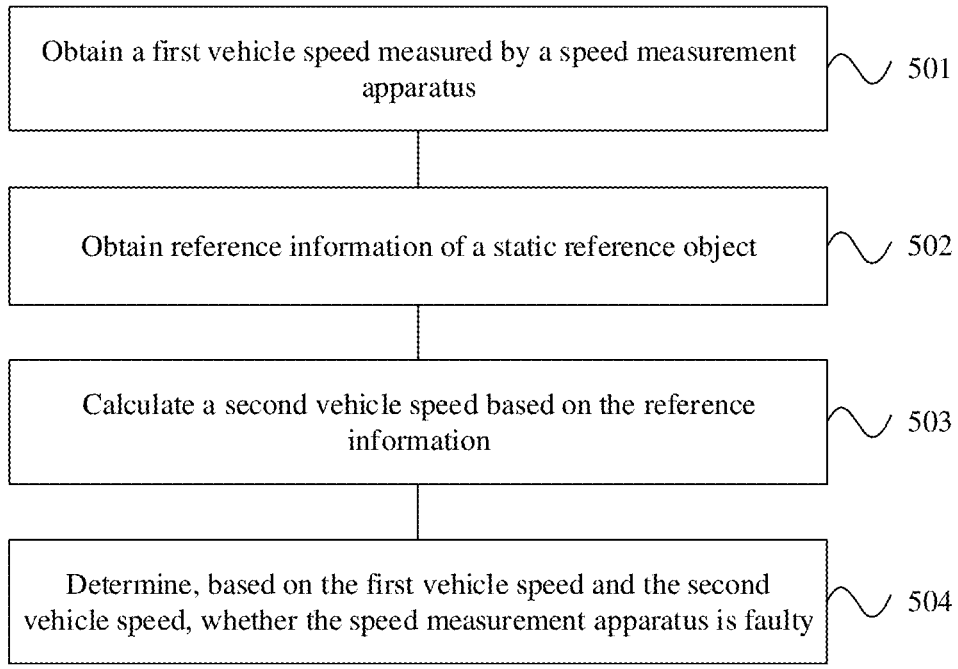
FIG. 5 is a schematic flowchart of a fault diagnosis method for a speed measurement apparatus according to an embodiment.

FIG. 5 is a schematic flowchart of a fault diagnosis method for a speed measurement apparatus according to an embodiment. The following describes steps in FIG. 5.

501: Obtain a first vehicle speed measured by a speed measurement apparatus.

502: Obtain reference information of a static reference object.

Optionally, reference information at N moments may be obtained, and N is an integer greater than 1. The N moments may be consecutive or may be nonconsecutive. This is not limited.

Optionally, the reference information may include information about a location relationship of the static reference object relative to a vehicle, and the vehicle may be understood as a vehicle in which a to-be-diagnosed speed measurement apparatus is located. That is, a location relationship of the static reference object relative to the vehicle at each of the N moments may be obtained.

Optionally, the location relationship may include a distance and a direction of the static reference object relative to the vehicle.

Optionally, the direction of the static reference object relative to the vehicle may be represented by an included angle between a connection line between the static reference object and the vehicle and a traveling direction of the vehicle.

It should be noted that a sequence of performing step 501 and step 502 is not limited.

Step 501 and step 502 may be performed simultaneously, step 501 may be performed before step 502, or step 502 may be performed before step 501.

Optionally, the static reference object may be directly set as a road sign, a transportation facility, or the like, so that each step for fault diagnosis is started once the road sign or the transportation facility is recognized.

Optionally, objects around the vehicle may be obtained, static objects are selected from the recognized objects, and the static reference object is selected from the static objects.

Figure 6:
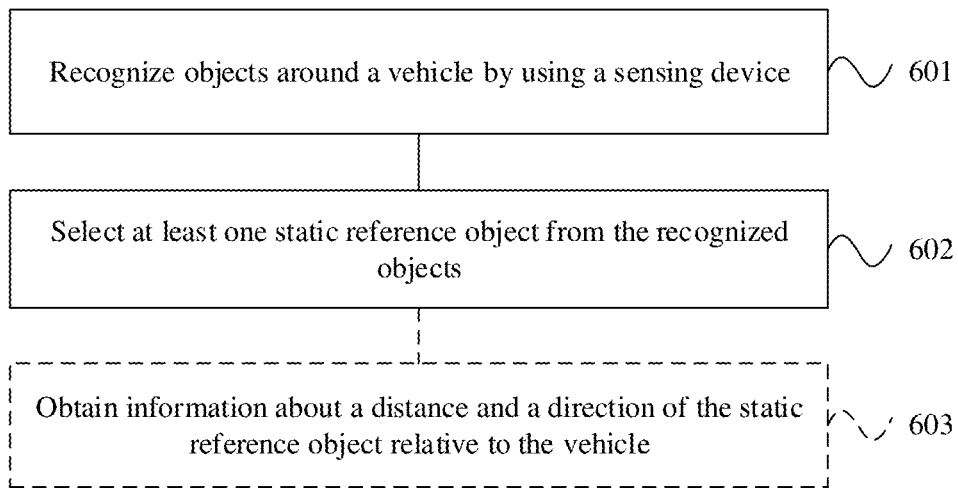
FIG. 6 is a schematic flowchart of selecting a static reference object according to an embodiment.

FIG. 6 is a schematic flowchart of selecting a static reference object according to an embodiment. The following describes steps in FIG. 6.

601: Recognize objects around a vehicle via a sensing device.

Optionally, the sensing device may include a camera or a radar.

Optionally, the camera may be used to obtain an image or a video. Then, the image is processed to recognize an object in the image.

Optionally, the radar may be further used to detect an object and detect whether the object is moving.

602: Select at least one static reference object from the recognized objects.

That is, at least one static object may be selected from the recognized objects, and the static object is used as the static reference object.

After the static reference object is selected, information about the static reference object may be obtained. The information about the static reference object includes a distance of the static reference object relative to the vehicle and a position/a direction of the static reference object relative to the vehicle. Then, step 603 may be performed.

603: Obtain the information about the distance and the direction of the static reference object relative to the vehicle.

It should be noted that FIG. 6 may provide a method for determining a static reference object. Step 603 may or may not be performed.

503: Calculate a second vehicle speed based on the reference information.

It should be noted that, in this embodiment, the second vehicle speed is used to indicate an estimated vehicle speed or may be understood as an inferred vehicle speed or a vehicle speed obtained through measurement by an apparatus that is not a speed measurement apparatus.

Optionally, the second vehicle speed may be calculated by using the reference information at the N moments. That is, an average vehicle speed in a time period may be calculated based on a variation of a displacement and/or an angle of the vehicle relative to the static reference object in the time period, and the average vehicle speed is used as the second vehicle speed. Alternatively, a plurality of average vehicle speeds may be obtained, and then the second vehicle speed is obtained based on the plurality of average vehicle speeds. Because a large amount of content is involved, descriptions are to be provided below with reference to FIG. 7 to FIG. 12, and details are not described herein.

It should be noted that step 503 may need to be performed after step 502 but may not necessarily be performed after step 501. That is, step 502 and step 503 may be performed before step 501; or step 501 may be performed between step 502 and step 503. This is not limited.

504: Determine, based on the first vehicle speed and the second vehicle speed, whether the speed measurement apparatus is faulty.

Optionally, whether the speed measurement apparatus is faulty may be determined based on a difference between the first vehicle speed and the second vehicle speed. When the difference falls within a threshold range, it is determined that the first vehicle speed is correct and the speed measurement apparatus is not faulty. When the difference does not fall within the threshold range, it is determined that the first vehicle speed is incorrect and the speed measurement apparatus is faulty.

Optionally, a plurality of second vehicle speeds may be calculated, to prevent an error from occurring in fault diagnosis because the second vehicle speed is estimated incorrectly or with a relatively large error. Then, when an error between the plurality of second vehicle speeds is relatively large, fault diagnosis is not performed. In other words, an inaccurate estimated second vehicle speed is not used as a basis for diagnosis.

Optionally, the plurality of second vehicle speeds may be obtained based on a same static reference object by using the foregoing method; or a plurality of static reference objects may be set, and second vehicle speeds of the plurality of reference objects are obtained by using the foregoing method.

Two second vehicle speeds are used as an example. A difference between each of the two second vehicle speeds and the first vehicle speed may be compared. Only when both differences are less than or equal to a specified threshold, it is determined that a vehicle speed sensor is faulty; otherwise, the second vehicle speed is re-obtained.

For another example, the following may be set: The second vehicle speed may be re-obtained when a difference between any one of the two second vehicle speeds and the first vehicle speed is greater than a threshold.

A case for three or more second vehicle speeds is similar, and is not described herein.

Figure 7:
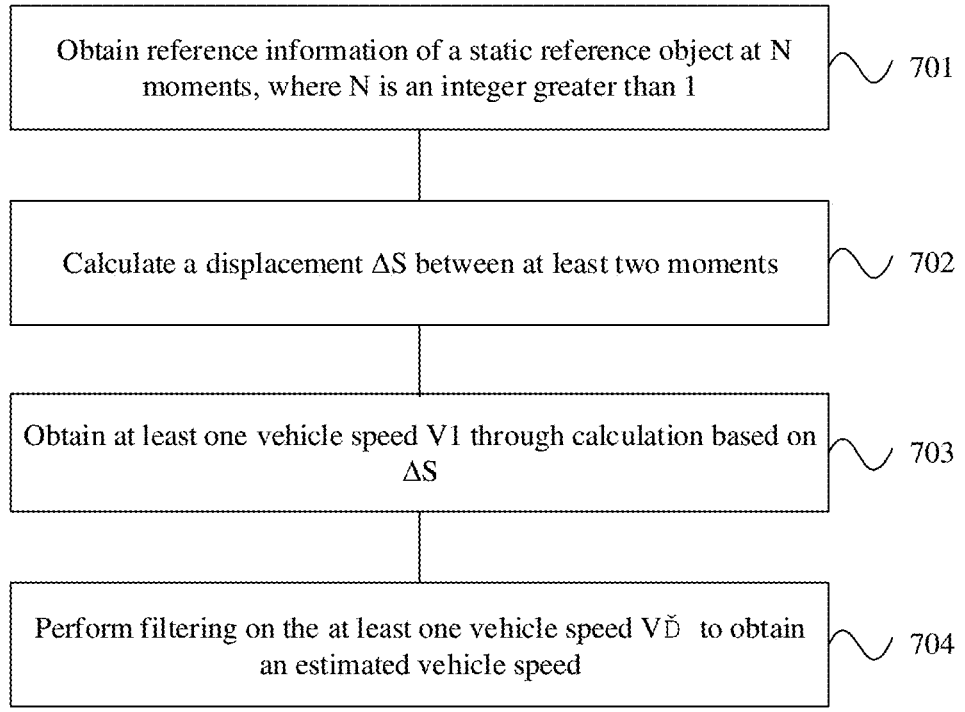
FIG. 7 is a schematic flowchart of a vehicle speed estimation method according to an embodiment.

FIG. 7 is a schematic flowchart of a vehicle speed estimation method according to an embodiment. The method shown in FIG. 7 may be applied to estimation performed when a vehicle travels straight on a flat road, for example, estimation performed during straight traveling in a flat road scenario shown in FIG. 8. The following describes steps in FIG. 7.

701: Obtain reference information of a static reference object at N moments, where N is an integer greater than 1.

Optionally, the reference information may include information about a location relationship of the static reference object relative to a vehicle, and the vehicle may be understood as a vehicle in which a to-be-diagnosed speed measurement apparatus is located. That is, a location relationship of the static reference object relative to the vehicle at each of the N moments may be obtained.

Optionally, the N moments may be consecutive moments, or may be inconsecutive moments, provided that the N moments are close to a moment corresponding to a first vehicle speed.

Optionally, N moments in a time length threshold range may be selected based on the moment corresponding to the first vehicle speed. Assuming that the first vehicle speed is measured at a moment T1 and the time length threshold range is Δt, N moments in a range of [T1−Δt, T1+Δt] may be selected. It should be understood that the N moments do not necessarily include T1. For example, N moments from T1+1 to T1+N may be selected. It should be further understood that the N moments may be consecutive or may be nonconsecutive. This is not limited.

702: Calculate at least one displacement ΔS between at least two moments.

It should be noted that the at least two moments are at least two of the N moments, and the two moments are not necessarily consecutive.

It should be further understood that, because displacements ΔS between more than two moments may be calculated, there may be one or more displacements ΔS.

Optionally, a displacement may be calculated based on a distance of the static reference object relative to the vehicle at two moments, and an included angle between a traveling direction of the vehicle and a connection line between the static reference object and the vehicle.

703: Obtain at least one estimated vehicle speed V' through calculation based on the at least one displacement ΔS and a time length between the at least two moments.

704: Obtain a second vehicle speed based on the at least one estimated vehicle speed V.

Optionally, the second vehicle speed may be obtained in a manner such as taking an average, a maximum value, or a minimum value. The following separately provides descriptions by using examples. It should be understood that, when there is only one estimated vehicle speed, a calculation result is equal to the estimated vehicle speed in any one of the foregoing manners of taking an average, a maximum value, and a minimum value. In this case, the estimated vehicle speed is the second vehicle speed. The following may describe a processing manner used when there may be a plurality of estimated vehicle speeds. However, it should be understood that only one estimated vehicle speed may be considered as a special case of the plurality of estimated vehicle speeds.

For example, the plurality of estimated vehicle speeds may be averaged to obtain an average estimated vehicle speed, and the average estimated vehicle speed is used as the second vehicle speed.

For another example, a maximum value may be selected from the plurality of estimated vehicle speeds as the second vehicle speed.

For another example, a minimum value may be selected from the plurality of estimated vehicle speeds as the second vehicle speed.

For another example, a maximum value and/or a minimum value may be removed, and then an average of remaining estimated vehicle speeds is used as the second vehicle speed.

Figure 8:
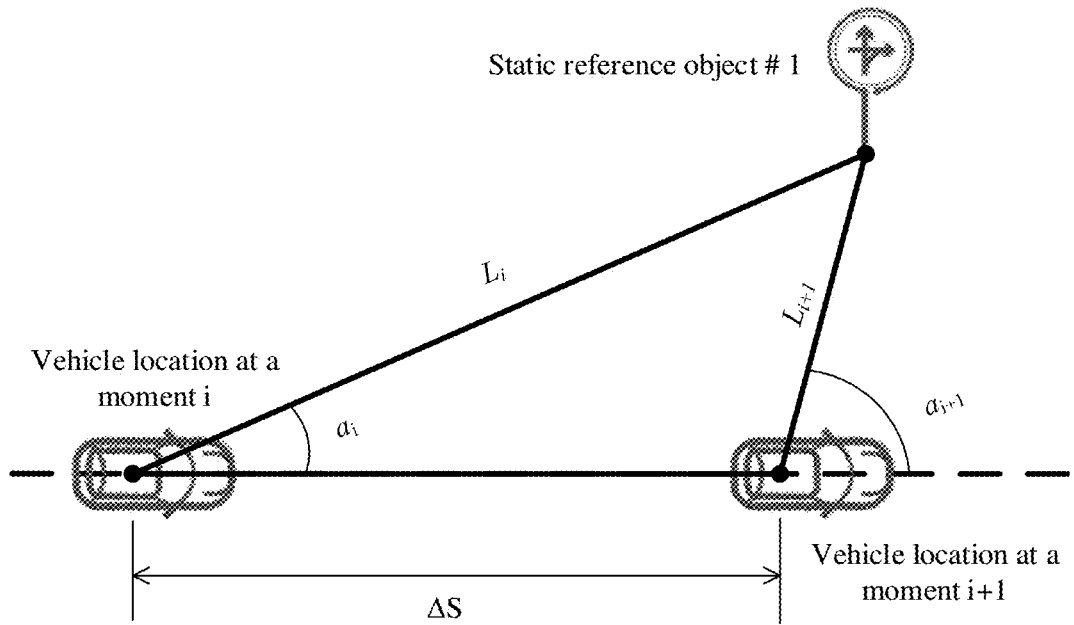
FIG. 8 is a schematic diagram of estimating a straight traveling vehicle speed in a flat road scenario according to an embodiment.

FIG. 8 is a schematic diagram of estimating a straight traveling vehicle speed in a flat road scenario according to an embodiment. In the scenario shown in FIG. 8, a vehicle travels straight on flat ground. By using a relative relationship between the vehicle and a static reference object at two different moments shown in FIG. 8, a vehicle displacement between two adjacent moments may be obtained, to obtain a current vehicle speed. A calculation process is described below by using an example.

It is assumed that a location relationship between the static reference object and the vehicle at adjacent N+1 sampling moments is obtained from a camera. At a moment I, a distance between the selected static reference object and the vehicle is $L_i$, and an included angle between a connection line between the selected static reference object and the current vehicle and a traveling direction of the vehicle is $\alpha_i$. At a moment i+1, a distance between the selected static reference object and the vehicle is $L_{i+1}$, and an included angle between the selected static reference object and the current vehicle is $\alpha_{i+1}$.

A displacement ΔS of the vehicle at two moments may be calculated based on a location relationship between the vehicle and the static reference object at the moment i and the moment i+1, and may be inferred from a geometric relationship in FIG. 8:

$$\Delta S = \sqrt{L_i^2 + L_{i+1}^2 - 2L_i L_{i+1} \cos(\alpha_{i+1} - \alpha_i)}.$$

A time interval between the moment i and the moment i+1 is $\Delta t$. Therefore, an average speed $v_i$ between the moment i and the moment i+1 may be inferred: $v_i = \Delta S / \Delta t$.

$v_i$ may be considered as the estimated vehicle speed " in FIG. 7.

Optionally, N average speeds of N time intervals from moments 1 to N+1 may be calculated by using the foregoing same method.

Optionally, the second vehicle speed may be determined through filtering. The filtering manner may be one of filtering manners such as mean filtering and median filtering. For details, refer to related descriptions in FIG. 7. Details are not described herein.

Figure 9:
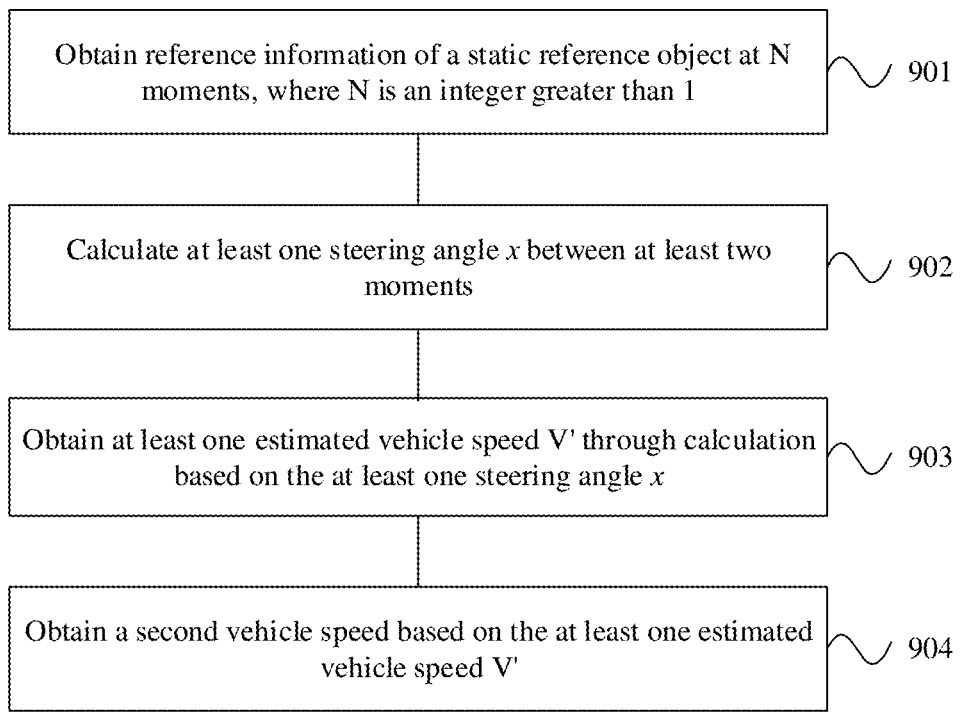
FIG. 9 is a schematic flowchart of another vehicle speed estimation method according to an embodiment.

FIG. 9 is a schematic flowchart of another vehicle speed estimation method according to an embodiment. The method shown in FIG. 9 may be applied to vehicle speed estimation performed when a vehicle turns on a flat road, for example, vehicle speed estimation performed during turning in a flat road scenario shown in FIG. 10. The following describes steps in FIG. 9.

901: Obtain reference information of a static reference object at N moments, where N is an integer greater than 1.

Optionally, the reference information may include information about a location relationship of the static reference object relative to a vehicle, and the vehicle may be understood as a vehicle in which a to-be-diagnosed speed measurement apparatus is located. That is, a location relationship of the static reference object relative to the vehicle at each of the N moments may be obtained.

Optionally, the N moments may be consecutive moments, or may be inconsecutive moments, provided that the N moments are close to a moment corresponding to a first vehicle speed.

Optionally, N moments in a time length threshold range may be selected based on the moment corresponding to the first vehicle speed. Assuming that the first vehicle speed is measured at a moment T1 and the time length threshold range is $\Delta t$, N moments in a range of [T1−$\Delta t$, T1+$\Delta t$] may be selected. It should be understood that the N moments do not necessarily include T1. For example, N moments from T1+1 to T1+N may be selected. It should be further understood that the N moments may be consecutive, or may be inconsecutive. This is not limited.

902: Calculate at least one steering angle x between at least two moments.

Optionally, a steering radius may be calculated based on a vehicle body length and a wheel steering angle, and then a steering angle is calculated based on a geometric relationship between the steering radius and the steering angle.

It should be noted that the at least two moments are at least two of the N moments, and the two moments are not necessarily consecutive.

It should be further understood that, because steering angles x between more than two moments may be calculated, there may be one or more steering angles x.

903: Obtain at least one estimated vehicle speed " through calculation based on the at least one steering angle x.

904: Obtain a second vehicle speed based on the at least one estimated vehicle speed ".

Optionally, the second vehicle speed may be obtained by using a same method as step 704. Details are not described again.

Figure 10:
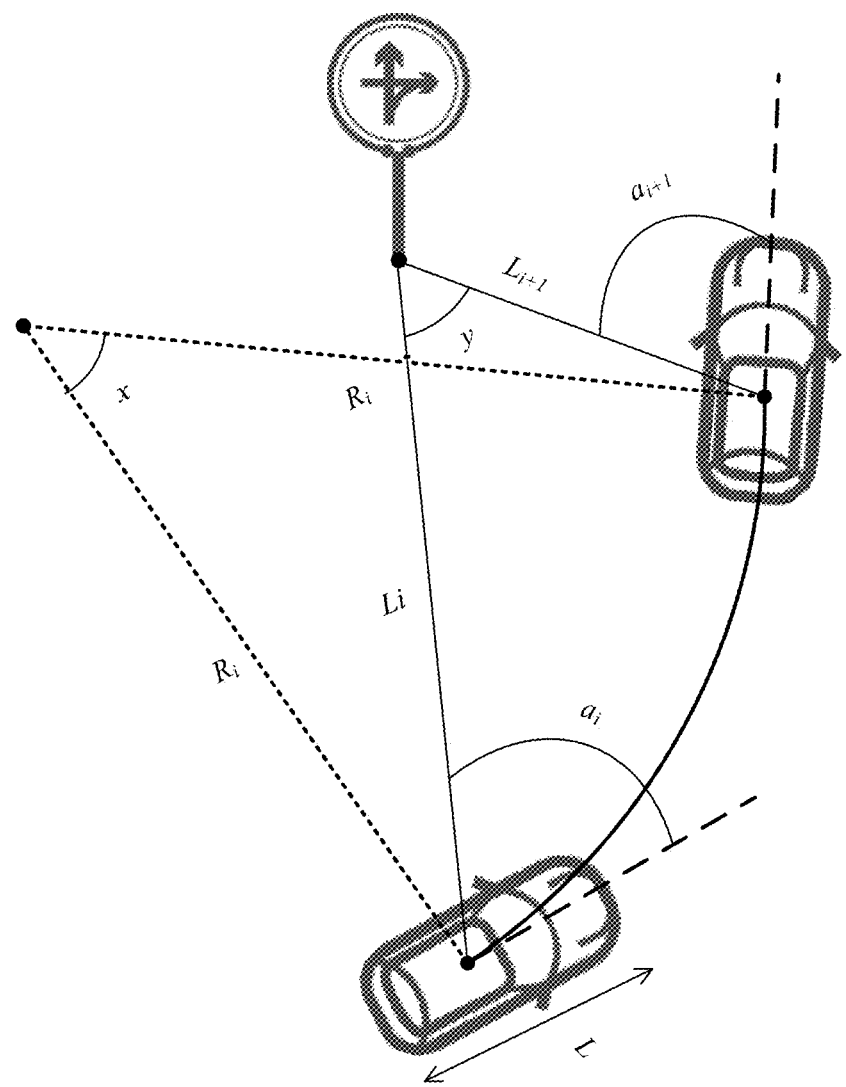
FIG. 10 is a schematic diagram of estimating a turning vehicle speed in a flat road scenario according to an embodiment.

FIG. 10 is a schematic diagram of estimating a turning vehicle speed in a flat road scenario according to an embodiment. In the scenario shown in FIG. 10, a vehicle turns on a flat road. By using a relative relationship between the vehicle and a static reference object at two different moments shown in FIG. 10, a vehicle steering angle x between two adjacent moments may be obtained, to obtain a current vehicle speed. A calculation process is described below by using an example.

It is assumed that a location relationship between the static reference object and the vehicle is obtained from a camera at adjacent N sampling moments. At a moment i, a distance between the selected static reference object and the vehicle is $L_i$, an included angle between a connection line between the selected static reference object and the current vehicle and a traveling direction of the vehicle is $\alpha_i$, and a wheel steering angle of the vehicle is $\delta_i$. At a moment (i+1), a distance between the selected static reference object and the vehicle is $L_{i+1}$, an included angle between a connection line between the static reference object and the current vehicle and a traveling direction of the vehicle is $\alpha_{i+1}$, and a wheel steering angle of the vehicle is $\delta_{i+1}$.

A steering radius $R_i$ at the moment i may be calculated based on a vehicle body length L and the wheel steering angle $\delta_i$ at the moment i, and $R_i$ is used as a steering radius from the moment i to the moment i+1, as marked in FIG. 10.

According to a geometric relationship shown in FIG. 10, a relationship between geometric variables such as the steering angle x and the steering radius $R_i$ that are used when the vehicle travels at the moment i to the moment i+1 is as follows:

$$x + (90° - \alpha_i) = y + (90° - \alpha_{i+1}),$$

and $$L_i^2 + L_{i+1}^2 - 2L_i L_{i+1} \cos y = 2R_i^2 - 2R_i^2 \cos x.$$

The steering angle x may be resolved by using the foregoing two formulas.

A time interval between the moment i and the moment i+1 is $\Delta t$. Therefore, an average speed $v_i$ between the moment i and the moment i+1 may be inferred: $v_i = xR_i/\Delta t$.

$v_i$ may be considered as the estimated vehicle speed " in FIG. 9.

Optionally, N average speeds of N time intervals from moments 1 to N+1 may be calculated by using the foregoing same method.

Optionally, the second vehicle speed may be determined through filtering. The filtering manner may be one of filtering manners such as mean filtering and median filtering. For details, refer to related descriptions described above. Details are not described herein.

Figure 11:
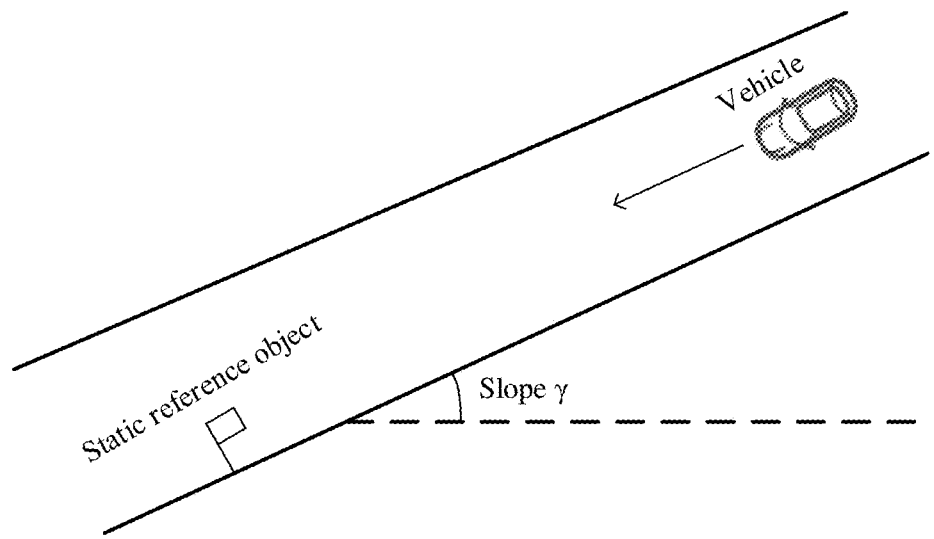
FIG. 11 is a schematic diagram of estimating a vehicle speed in a sloped road scenario according to an embodiment.

FIG. 11 is a schematic diagram of estimating a vehicle speed in a sloped road scenario according to an embodiment. In a scenario shown in FIG. 11, a static reference object and a vehicle are on a sloped road. It may be understood from FIG. 11 that, in this case, it is equivalent to that the static reference object and the vehicle are on a flat road, which is a flat road on which the sloped road is located herein. Therefore, a same calculation method as that in the flat road may be used. For example, when the vehicle travels straight, the method shown in FIG. 7 or FIG. 8 may be used. When the vehicle turns, the method shown in FIG. 9 or FIG. 10 may be used. For brevity, details are not described herein again.

Figure 12:
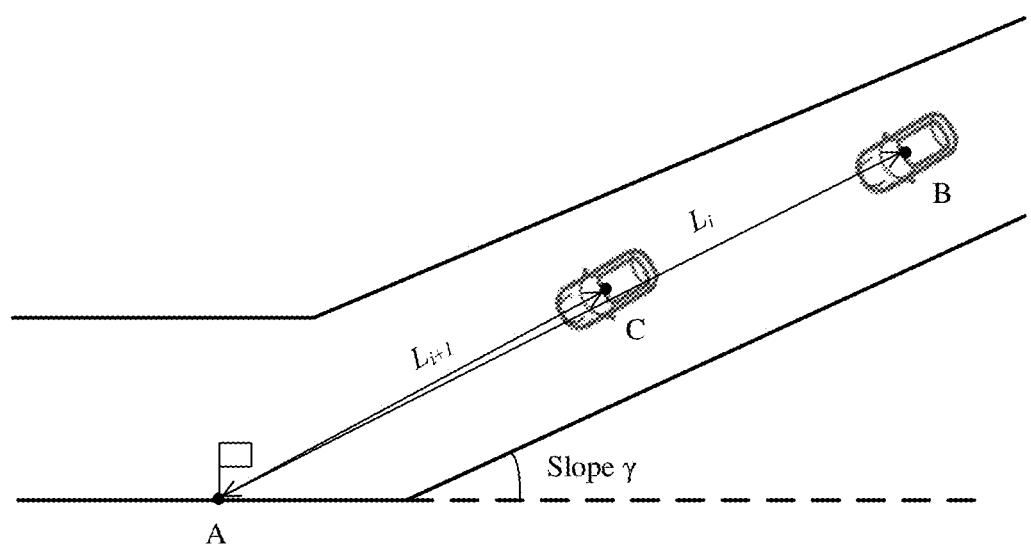
FIG. 12 is a schematic diagram of estimating a vehicle speed in another sloped road scenario according to an embodiment.

FIG. 12 is a schematic diagram of estimating a vehicle speed in another sloped road scenario according to an embodiment. As shown in FIG. 12, a vehicle travels on a sloped road, but a static reference object is on a flat road in front of the sloped road. It may be understood that FIG. 12 shows a case in which the static reference object and the vehicle are not on a same plane. However, it should be understood that the scenario shown in FIG. 12 may be considered as a case in which the vehicle is on a sloped road, and the static reference object is on a flat road or may be considered as a case in which the vehicle is on a flat road, and the static reference object is on a sloped road.

In the scenario shown in FIG. 12, coordinates of the static reference object (coordinates of a point A in FIG. 12), coordinates of the vehicle at a moment i (coordinates of a point B in FIG. 12), and coordinates of the vehicle at a moment i+1 (coordinates of a point C in FIG. 12) may be marked by using a three-dimensional coordinate system establishment method, so that an average vehicle speed $v_i$ of the vehicle between the moment i and the moment i+1 can be estimated based on a geometric relationship between the three, to further obtain a second vehicle speed. The following provides descriptions by using an example.

Assuming that a slope of the sloped road is estimated to be γ by using an acceleration sensor of the vehicle, and a distance $L_i$ and a distance $L_{i+1}$ between the static reference object and vehicle and an included angle $α_i$ and an included angle $α_{i+1}$ between the static reference object and a traveling direction at the moment i and the moment i+1 are obtained by using a camera.

A coordinate system is established by using a plane in which a traveling direction of a vehicle and a horizontal line (a dashed line shown in FIG. 12) are located as an XZ plane. Assuming that a distance between a point B and an origin is P, and a distance between a point C and an origin is Q, coordinates of the point B and the point C may be respectively B (−M cos γ, 0, M sin γ) and C (−N cos γ, 0, N sin γ). It is assumed that the coordinates of the static reference object are A (X, Y, 0).

The geometric relationship between the three meets the following formula:

$$\cos_i = (X+P\cos γ, Y, -P\sin γ)(-\cos γ, 0, -\sin γ)/(P-Q)/L_i;$$

$$\cos_{i+1} = (X+Q\cos γ, Y, -Q\sin γ)(-\cos γ, 0, -\sin γ)/(P-Q)/L_{i+1};$$

$$L_i^2 = (X+P\cos γ)^2 + Y2 + (P\sin γ)^2; \text{ and}$$

$$L_{i+1}^2 = (X+Q\cos γ)^2 + Y^2 + (Q\sin γ)^2.$$

By using the foregoing formulas, values of P and Q may be resolved.

A time interval between the moment i and the moment i+1 is Δt. Therefore, an average speed $v_i$ between the moment i and the moment i+1 may be inferred: $v_i=(P-Q)/Δt$.

It should be noted that the method shown in FIG. 12 may be understood as extension of the method shown in FIG. 7 and the method shown in FIG. 8 from two-dimensional space to three-dimensional space. Therefore, a flat road may be considered as a special case of the scenario shown in FIG. 12. That is, the scenarios shown in FIG. 7 and FIG. 8 may be considered as special cases in which the slope γ is 0 in FIG. 11 and FIG. 12. In this case, the foregoing formulas are also applicable.

It should be further understood that, when the vehicle and the static reference object are not on a same road plane and the vehicle turns, a coordinate system may also be established for calculation, and the method shown in FIG. 9 and the method shown in FIG. 10 may be considered as extension from two-dimensional space to three-dimensional space. For brevity, details are not described again.

It should be further understood that FIG. 7 to FIG. 11 show a case in which the vehicle and the static reference object are on a same road plane. FIG. 7 to FIG. 10 show a case in which the vehicle and the static reference object are on a flat road, and FIG. 11 shows a case in which the vehicle and the static reference object are on a sloped road. FIG. 12 shows a case in which the vehicle and the static reference object are not on a same road plane. It may be understood that, regardless of whether the vehicle and the static reference object are on a same road plane, or whether the vehicle travels straight or turns, an average vehicle speed at a time interval may be calculated by using the location relationship between the vehicle and the static reference object, to obtain the second vehicle speed, and determine, by using the second vehicle speed, whether the first vehicle speed is accurate.

In the embodiments, a vehicle speed of the vehicle may be estimated by using a static reference object outside the vehicle, and then whether the vehicle speed measured by the speed measurement apparatus is normal may be determined based on the estimated vehicle speed, to determine whether the speed measurement apparatus is faulty. This solution does not need to rely on self-vehicle power information of the vehicle, and therefore is not limited by coverage of each type of self-vehicle power information. Therefore, this solution has a wider diagnosis range, so that a fault of the speed measurement apparatus can be more accurately diagnosed.

The foregoing describes the fault diagnosis method for the vehicle speed measurement apparatus in the embodiments, and the following describes a fault diagnosis apparatus for a vehicle speed measurement apparatus in the embodiments. It should be understood that the fault diagnosis apparatus described below can perform processes of the fault diagnosis method in the embodiments. Repeated descriptions are appropriately omitted in the following descriptions of the apparatus embodiments.

Figure 13:
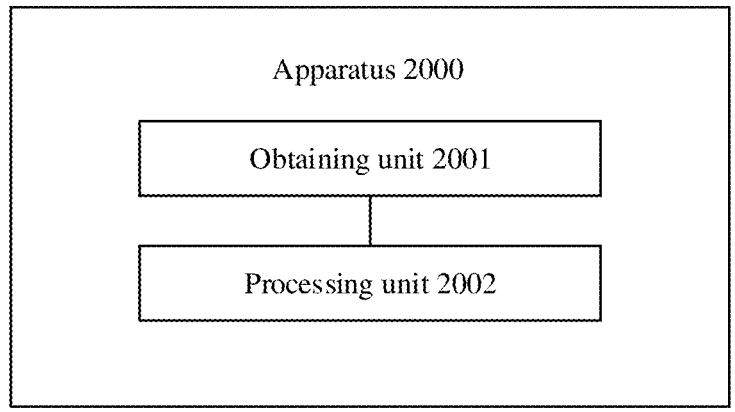
FIG. 13 is a schematic diagram of a fault diagnosis apparatus for a vehicle speed measurement apparatus according to an embodiment.

FIG. 13 is a schematic diagram of a fault diagnosis apparatus for a vehicle speed measurement apparatus according to an embodiment. The apparatus 2000 includes an obtaining unit 2001 and a processing unit 2002. The apparatus 2000 may be configured to perform steps of the fault diagnosis method for the vehicle speed measurement apparatus in the embodiments. For example, the obtaining unit 2001 may be configured to perform step 501 and step 502 in the method shown in FIG. 5, and the processing unit 2002 may be configured to perform step 503 and step 504 in the method shown in FIG. 5. For another example, the obtaining unit 2001 may be configured to perform step 601 in the method shown in FIG. 6, and the processing unit 2002 may be configured to perform step 602 in the method shown in FIG. 6. When the method shown in FIG. 6 includes step 603, the obtaining unit 2001 may be further configured to perform step 603. For another example, the obtaining unit 2001 may be configured to perform step 701 in the method shown in FIG. 7, and the processing unit 2002 may be configured to perform step 702 to step 704 in the method shown in FIG. 7. For another example, the obtaining unit 2001 may be configured to perform step 901 in the method shown in FIG. 9, and the processing unit 2002 may be configured to perform step 902 to step 904 in the method shown in FIG. 9.

For another example, the apparatus 2000 may be further configured to perform steps in the methods shown in FIG. 8, FIG. 10, FIG. 11, and FIG. 12.

The apparatus 2000 may be the fault diagnosis apparatus 420 shown in FIG. 4. The obtaining unit 2001 may be equivalent to the obtaining unit 421, and the processing unit 2002 may be equivalent to the diagnosis unit 422.

Figure 14:
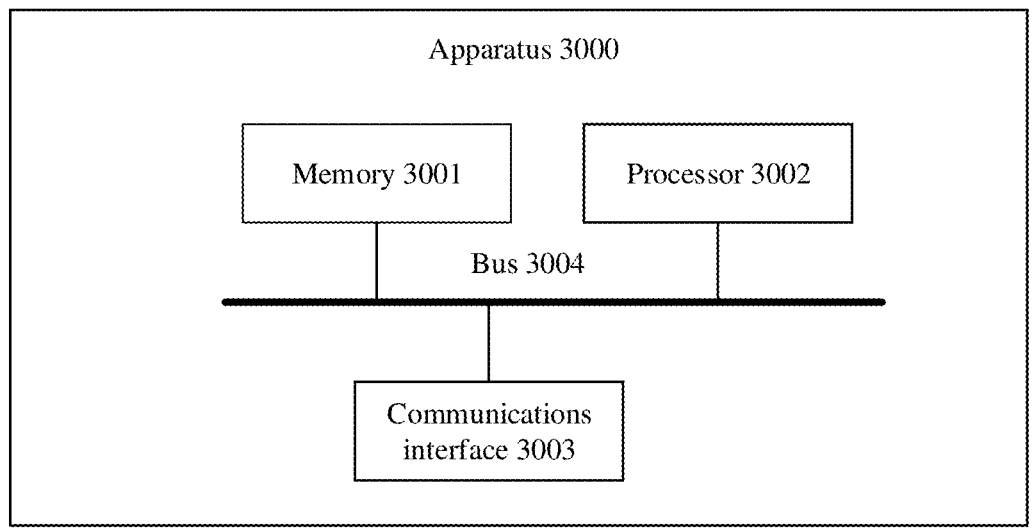
FIG. 14 is a schematic diagram of a fault diagnosis apparatus for a vehicle speed measurement apparatus according to an embodiment.

FIG. 14 is a schematic diagram of a fault diagnosis apparatus for a vehicle speed measurement apparatus according to an embodiment. The apparatus 3000 includes a memory 3001, a processor 3002, a communications interface 3003, and a bus 3004. The memory 3001, the processor 3002, and the communications interface 3003 are communicatively connected to each other by using the bus 3004.

Optionally, the memory 3001 may be a read-only memory (ROM), a static storage device, a dynamic storage device, or a random access memory (RAM). The memory 3001 may store a program. When the program stored in the memory 3001 is executed by the processor 3002, the processor 3002 and the communications interface 3003 are configured to perform steps of the fault diagnosis method for the vehicle speed measurement apparatus in the embodiments.

Optionally, the memory 3001 may have a function of the memory 152 shown in FIG. 1, a function of the system memory 235 shown in FIG. 2, or a function of the memory 340 shown in FIG. 4, to implement the foregoing function of storing the program. Optionally, the processor 3002 may be a general-purpose CPU, a microprocessor, an ASIC, a graphic processing unit (GPU), or one or more integrated circuits for executing a related program, to implement functions that need to be implemented by units in the fault diagnosis apparatus in the embodiments, or perform steps of the fault diagnosis method in the embodiments.

Optionally, the processor 3002 may have a function of the processor 151 shown in FIG. 1, a function of the processor 203 shown in FIG. 2, or a function of the processor 330 shown in FIG. 3, to implement the foregoing function of executing a related program.

Optionally, the processor 3002 may alternatively be an integrated circuit chip, and has a signal processing capability. In an implementation process, steps of the fault diagnosis method in the embodiments may be completed by using an integrated logic circuit of hardware in the processor or by using an instruction in a form of software.

Optionally, the processor 3002 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 3002 may implement or perform the methods, the steps, and the logical block diagrams in the embodiments. The general-purpose processor may be a microprocessor, or the processor may be any conventional processor, or the like. Steps of the methods with reference to the embodiments may be directly performed and completed by a hardware decoding processor or may be performed and completed by using a combination of hardware and software modules in the decoding processor. A software module may be located in a non-transitory storage medium in the art, such as a random access memory, a flash memory, a read-only memory, a programmable read-only memory, an electrically erasable programmable memory, or a register. The non-transitory storage medium is located in a memory, and the processor reads information in the memory and completes, with reference to hardware of the processor, functions that need to be implemented by the units included in the fault diagnosis apparatus for the vehicle speed measurement apparatus in the embodiments, or performs steps of the fault diagnosis method for the vehicle speed measurement apparatus in the embodiments.

Optionally, the communications interface 3003 implements communication between the apparatus and another device or a communications network via a transceiver apparatus, for example, but not limited to a transceiver.

The bus 3004 may include a path for transmitting information between the components (for example, the memory, the processor, and the communications interface) of the apparatus.

An embodiment may further provide a computer program product including instructions. When the instructions are executed by a computer, the computer is enabled to implement the method in the foregoing method embodiments.

For explanations and beneficial effects of related content in any one of the foregoing fault diagnosis apparatuses, refer to the foregoing corresponding method embodiments. Details are not described herein again.

Unless otherwise defined, all terms may have the same meanings as commonly understood by a person skilled in the art. The terms are merely for the purpose of describing the embodiments and are not intended to limit.

Optionally, a network device in the embodiments may include a hardware layer, an operating system layer running at the hardware layer, and an application layer running at the operating system layer. The hardware layer may include hardware such as a CPU, a memory management unit (MMU), and memory (also referred to as main memory). An operating system at the operating system layer may be any one or more of computer operating systems implementing service processing by using a process, for example, a Linux operating system, a Unix operating system, an Android operating system, an iOS operating system, or a Windows operating system. The application layer may include applications such as a browser, contacts, word processing software, and instant communication software.

A structure of an execution body of the method provided in the embodiments is not limited, provided that a program that records code of the method provided in the embodiments can be run to perform communication according to the method.

Aspects or features may be implemented as a method, an apparatus or a product that uses standard programming and/or engineering technologies. The term "product" used in this application may cover a computer program that can be accessed from any non-transitory computer-readable component, carrier, or medium. For example, a non-transitory computer-readable medium may include, but is not limited to: a magnetic storage component (for example, a hard disk, a floppy disk, or a magnetic tape), an optical disc (for example, a compact disc (CD) or a digital versatile disc (DVD)), a smart card, and a flash memory (for example, an erasable programmable read-only memory (EPROM), a card, a stick, or a key drive).

Various storage media may represent one or more devices and/or other machine-readable media that are configured to store information. The term "machine-readable media" may include various non-transitory media that can store, include, and/or carry instructions and/or data.

It should be noted that when the processor is a general-purpose processor, a DSP, an ASIC, an FPGA or another programmable logic device, a discrete gate, a transistor logic device, or a discrete hardware component, the memory (storage module) may be integrated into the processor.

It should be further noted that the memory may be intended to include, but is not limited to, these memories and any other memory of a suitable type.

A person of ordinary skill in the art may be aware that, in combination with the examples described in the embodiments, units and steps may be implemented by electronic hardware or a combination of computer software and electronic hardware. Whether the functions are performed by hardware or software depends on particular applications. A person skilled in the art may use different methods to implement the described functions but it should not be considered that the implementation goes beyond the scope of the embodiments.

It may be clearly understood by a person skilled in the art that, for the purpose of convenient and brief description, for a detailed working process of the foregoing apparatus and unit, reference is made to a corresponding process in the foregoing method embodiments. Details are not described herein again.

In the several embodiments, it should be understood that the apparatuses and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments may be integrated into one unit, or each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the embodiments may be implemented in a form of a computer software product. The computer software product is stored in a non-transitory storage medium, and the computer software product includes several instructions. The instructions are used to enable a computer device (which may be a personal computer, a server, or a network device) to perform all or some of the steps of the methods described in the embodiments. The foregoing non-transitory storage medium may include, but is not limited to, any medium that can store program code, such as a USB flash drive, a removable hard disk, a ROM, a RAM, a magnetic disk, or an optical disc.

The foregoing descriptions are merely implementations, but are not intended as limiting. Any variation or replacement readily figured out by a person skilled in the art shall fall within the scope of the embodiments.

What is claimed is:

1. A fault diagnosis method for a speed measurement apparatus of a vehicle, the fault diagnosis method comprising:
    obtaining a first vehicle speed measured by the speed measurement apparatus;
    recognizing objects around the vehicle by identifying the objects in an image or video captured by a camera of the vehicle;
    selecting a static reference object of a plurality of static reference objects from the recognized objects;
    obtaining reference information of the plurality of static reference objects at N moments, wherein N is an integer greater than 1, and the reference information comprises information about a location relationship of the plurality of static reference objects relative to the vehicle in which the speed measurement apparatus is located at each of the N moments;
    obtaining a plurality of second vehicle speeds through calculation based on the reference information, one for each of the plurality of static reference objects;
    based on a difference between the first vehicle speed and any one of the plurality of second vehicle speeds being greater than a preset threshold, determining that the speed measurement apparatus is faulty and re-obtaining the plurality of second vehicle speeds; and
    determining that the speed measurement apparatus is not faulty based on all of the differences between the first vehicle speed and each of the plurality of second vehicle speeds being less than or equal to the preset threshold.

2. The fault diagnosis method according to claim 1, wherein obtaining the plurality of second vehicle speeds through calculation based on the reference information further comprises:
    obtaining at least one estimated vehicle speed through calculation by using the reference information at the N moments, wherein the at least one estimated vehicle speed is an average vehicle speed between any two moments in the N moments; and
    processing the at least one estimated vehicle speed to obtain a vehicle speed of the plurality of second vehicle speeds.

3. The fault diagnosis method according to claim 2, wherein obtaining the at least one estimated vehicle speed through calculation by using the reference information at the N moments further comprises:
    when the vehicle and a first static reference object of the plurality of static reference objects are on a same road plane and the vehicle travels straight, performing the following operations:
        obtaining a displacement of the vehicle relative to the first static reference object between the two moments through calculation by using a distance of the first static reference object relative to the vehicle and an included angle between the first static reference object and a traveling direction of the vehicle; and
        obtaining the average speed between the two moments through calculation by using the displacement and a time length between the two moments.

4. The fault diagnosis method according to claim 2, wherein obtaining the at least one estimated vehicle speed through calculation by using the reference information at the N moments further comprises:
    when the vehicle and a first static reference object of the plurality of static reference objects are on a same road plane and the vehicle turns, performing the following operations:
        obtaining a steering angle of the vehicle between the two moments and a steering radius of the vehicle through calculation by using a distance between the first static reference object and the vehicle, a wheel steering angle of the vehicle, and a length of the vehicle; and obtaining the average speed between the two moments through calculation by using the steering angle, the steering radius, and a time length between the two moments.

5. The fault diagnosis method according to claim 2, wherein obtaining the at least one estimated vehicle speed through calculation by using the reference information at the N moments further comprises:
when the vehicle and a first static reference object of the plurality of static reference objects are not on a same road plane and the vehicle travels straight, performing the following operations:
establishing any three-dimensional coordinate system, and indicating coordinates of the first static reference object and coordinates of locations of the vehicle at the two moments;
obtaining a displacement of the vehicle relative to the first static reference object between the two moments through calculation based on the coordinates of the first static reference object and the coordinates of the locations of the vehicle at the two moments; and
obtaining the average speed between the two moments through calculation by using the displacement and a time length between the two moments.

6. The fault diagnosis method according to claim 2, wherein obtaining the at least one estimated vehicle speed through calculation by using the reference information at the N moments further comprises:
when the vehicle and a first static reference object of the plurality of static reference objects are not on a same road plane and the vehicle turns, performing the following operations:
establishing any three-dimensional coordinate system, and indicating coordinates of the first static reference object and coordinates of locations of the vehicle at the two moments;
obtaining a steering angle of the vehicle between the two moments and a steering radius of the vehicle through calculation by using a distance between the first static reference object and the vehicle, a wheel steering angle of the vehicle, and a length of the vehicle; and
obtaining the average speed between the two moments through calculation by using the steering angle, the steering radius, and a time length between the two moments.

7. The fault diagnosis method according to claim 2, wherein processing the at least one estimated vehicle speed to obtain the plurality of second vehicle speeds further comprises:
performing filtering comprising mean filtering or median filtering on the at least one estimated vehicle speed; and
using a vehicle speed obtained through the filtering as the vehicle speed of the plurality of second vehicle speeds.

8. A fault diagnosis apparatus for a speed measurement apparatus of a vehicle, comprising:
a memory storing instructions; and
a processor configured to execute the instructions to cause the fault diagnosis apparatus to:
obtain a first vehicle speed measured by the speed measurement apparatus;
recognize objects around the vehicle by identifying objects in an image or video captured by a camera of the vehicle;
selecting a static reference objects of a plurality of static reference objects from the recognized objects;
obtain reference information of the plurality of static reference objects at N moments, wherein N is an integer greater than 1, and the reference information comprises information about a location relationship of the plurality of static reference objects relative to the vehicle in which the speed measurement apparatus is located at each of the N moments;
obtain a plurality of second vehicle speeds through calculation based on the reference information, one for each of the plurality of static reference objects;
based on a difference between the first vehicle speed and any one of the plurality of second vehicle speeds being greater than a preset threshold, determine that the speed measurement apparatus is faulty and re-obtain the plurality of second vehicle speeds; and
determine that the speed measurement apparatus is not faulty based on all of the differences between the first vehicle speed and each of the plurality of second vehicle speeds being less than or equal to the preset threshold.

9. The fault diagnosis apparatus according to claim 8, wherein the obtaining the plurality of second vehicle speeds through calculation based on the reference information further comprises:
obtaining at least one estimated vehicle speed through calculation by using the reference information at the N moments, wherein the estimated vehicle speed is an average vehicle speed between any two moments in the N moments; and
processing the at least one estimated vehicle speed to obtain a vehicle speed of the plurality of second vehicle speeds.

10. The fault diagnosis apparatus according to claim 9, wherein obtaining the at least one estimated vehicle speed through calculation by using the reference information at the N moments further comprises:
when the vehicle and a first static reference object are not on a same road plane and the vehicle travels straight, performing the following operations:
establishing any three-dimensional coordinate system, and indicating coordinates of the first static reference object and coordinates of locations of the vehicle at the two moments;
obtaining a displacement of the vehicle relative to the first static reference object between the two moments through calculation based on the coordinates of the first static reference object and the coordinates of the locations of the vehicle at the two moments; and
obtaining the average speed between the two moments through calculation by using the displacement and a time length between the two moments.

11. The fault diagnosis apparatus according to claim 9, wherein obtaining the at least one estimated vehicle speed through calculation by using the reference information at the N moments further comprises:
when the vehicle and a first static reference object are not on a same road plane and the vehicle turns, performing the following operations:
establishing any three-dimensional coordinate system, and indicating coordinates of the first static reference object and coordinates of locations of the vehicle at the two moments;
obtaining a steering angle of the vehicle between the two moments and a steering radius of the vehicle through calculation by using a distance between the first static reference object and the vehicle, a wheel steering angle of the vehicle, and a length of the vehicle; and obtaining the average speed between the two moments through calculation by using the steering angle, the steering radius, and a time length between the two moments.

12. The fault diagnosis apparatus according to claim 9, wherein processing the at least one estimated vehicle speed to obtain the plurality of second vehicle speeds further comprises:

performing filtering comprising mean filtering or median filtering on the at least one estimated vehicle speed; and using a vehicle speed obtained through the filtering as the vehicle speed of the plurality of second vehicle speeds.

13. The fault diagnosis apparatus according to claim 8, wherein obtaining the at least one estimated vehicle speed through calculation by using the reference information at the N moments further comprises:

when the vehicle and a first static reference object are on a same road plane and the vehicle travels straight, performing the following operations:

obtaining a displacement of the vehicle relative to the first static reference object between the two moments through calculation by using a distance of the first static reference object relative to the vehicle and an included angle between the first static reference object and a traveling direction of the vehicle; and obtaining the average speed between the two moments through calculation by using the displacement and a time length between the two moments.

14. The fault diagnosis apparatus according to claim 13, wherein obtaining the at least one estimated vehicle speed through calculation by using the reference information at the N moments further comprises:

when the vehicle and a first static reference object are on a same road plane and the vehicle turns, performing the following operations:

obtaining a steering angle of the vehicle between the two moments and a steering radius of the vehicle through calculation by using a distance between the first static reference object and the vehicle, a wheel steering angle of the vehicle, and a length of the vehicle; and obtaining the average speed between the two moments through calculation by using the steering angle, the steering radius, and a time length between the two moments.

15. A vehicle, comprising:

a fault diagnosis apparatus;

a camera; and a speed measurement apparatus;

wherein the fault diagnosis apparatus is configured to perform fault diagnosis, the fault diagnosis comprising:

obtaining a first vehicle speed measured by the speed measurement apparatus;

recognizing objects around the vehicle by identifying the objects in an image or video captured by the camera;

selecting a static reference object of a plurality of static reference objects from the recognized objects:

obtaining reference information of the plurality of static reference objects at N moments, wherein N is an integer greater than 1, and the reference information comprises information about a location relationship of the plurality of static reference objects relative to the vehicle in which the speed measurement apparatus is located at each of the N moments;

obtaining a plurality of second vehicle speeds through calculation based on the reference information, one for each of the plurality of static reference objects;

based on a difference between the first vehicle speed and any one of the plurality of second vehicle speeds being greater than a preset threshold, determining that the speed measurement apparatus is faulty and re-obtaining the plurality of second vehicle speeds; and determining that the speed measurement apparatus is not faulty based on all of the differences between the first vehicle speed and each of the plurality of second vehicle speeds being less than or equal to the preset threshold.

* * * * *